Feb. 6, 1968    M. C. NEUMAN ET AL    3,367,234
GUIDED MISSILE LAUNCHING SYSTEM

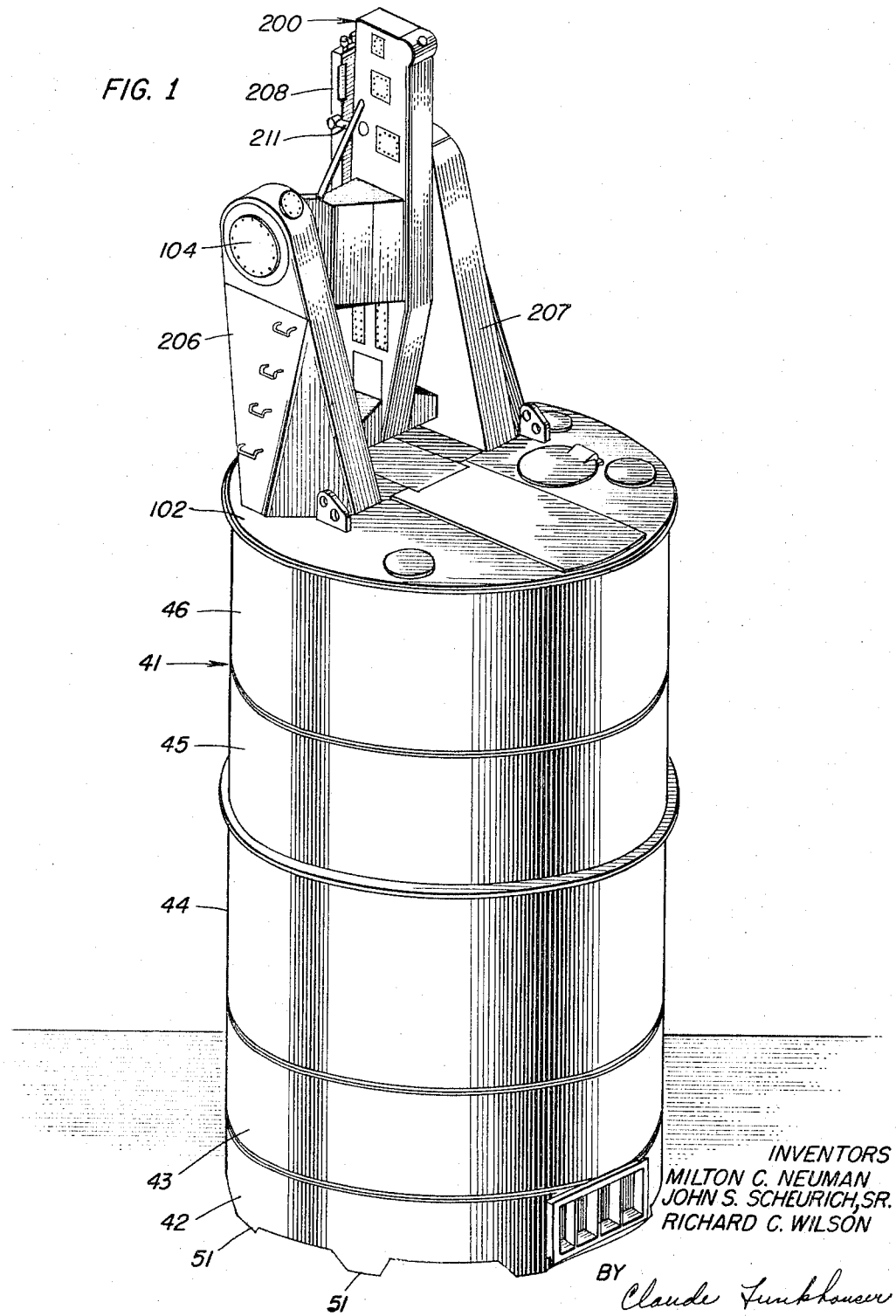

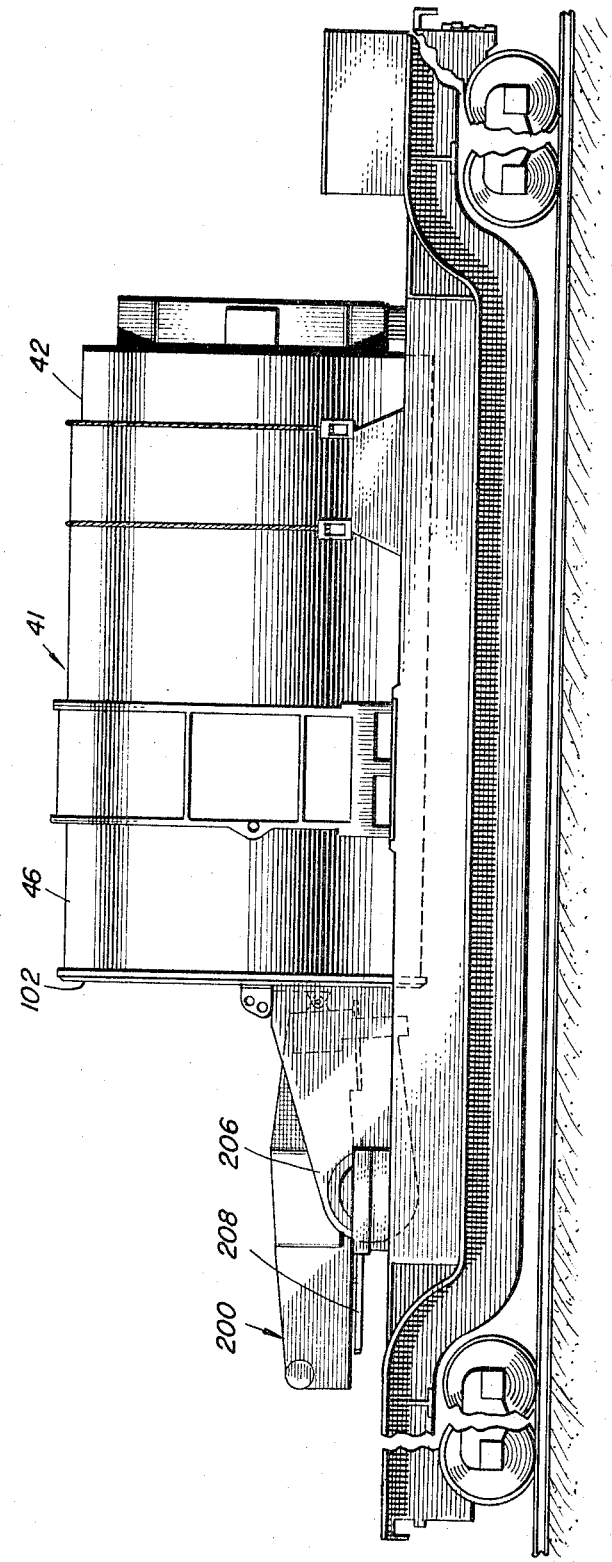

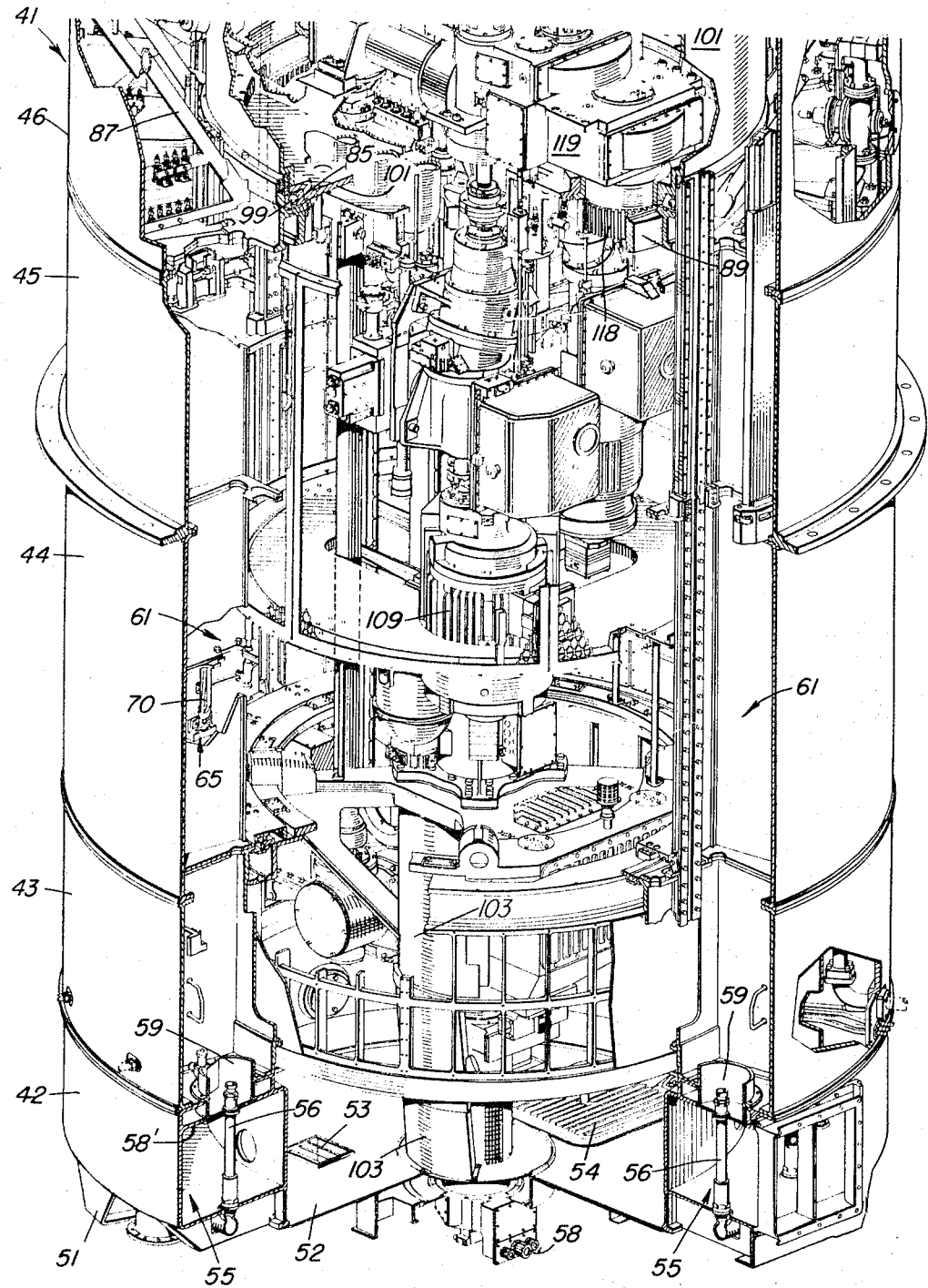

Filed Oct. 5, 1965    33 Sheets-Sheet 10

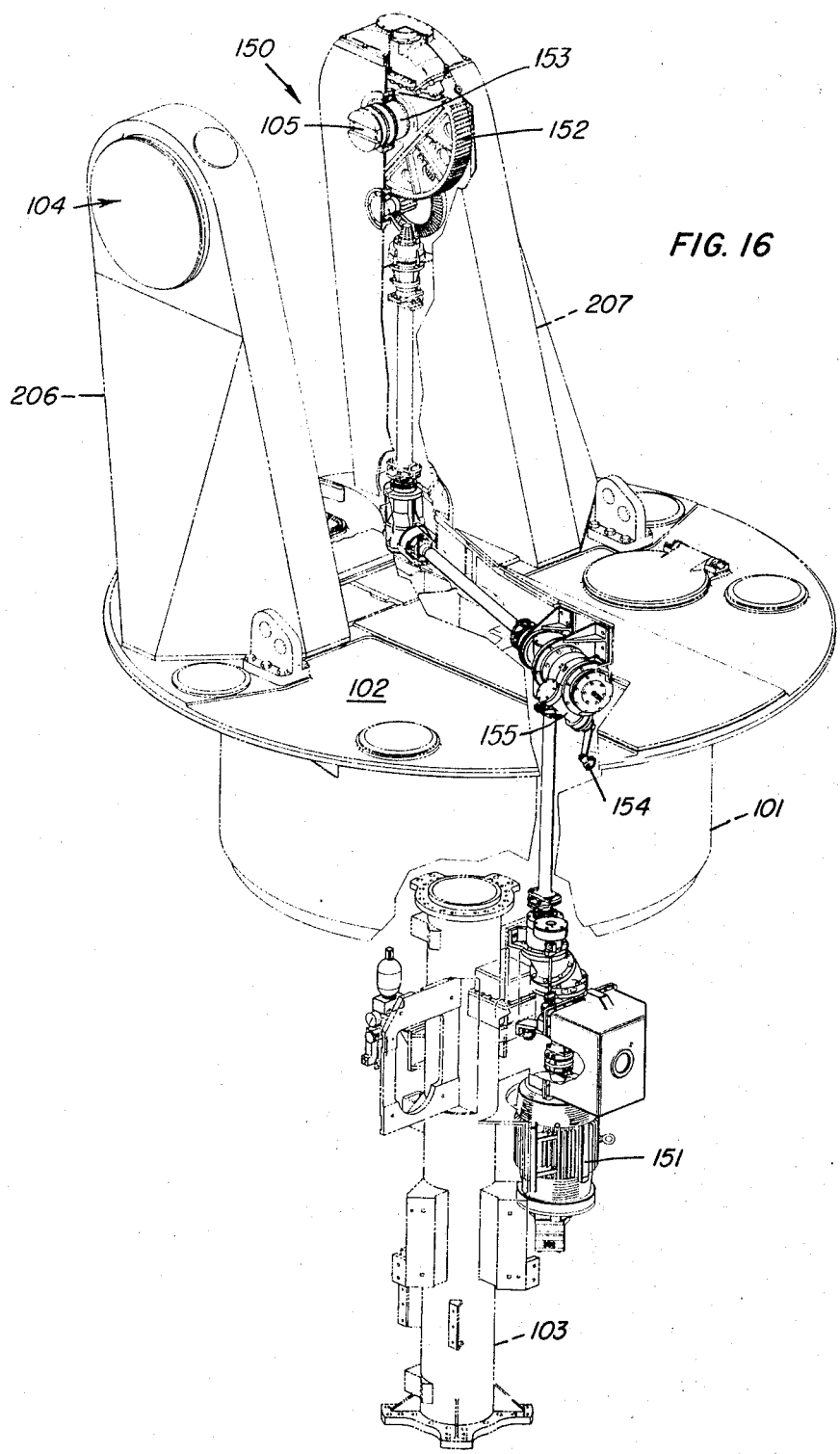

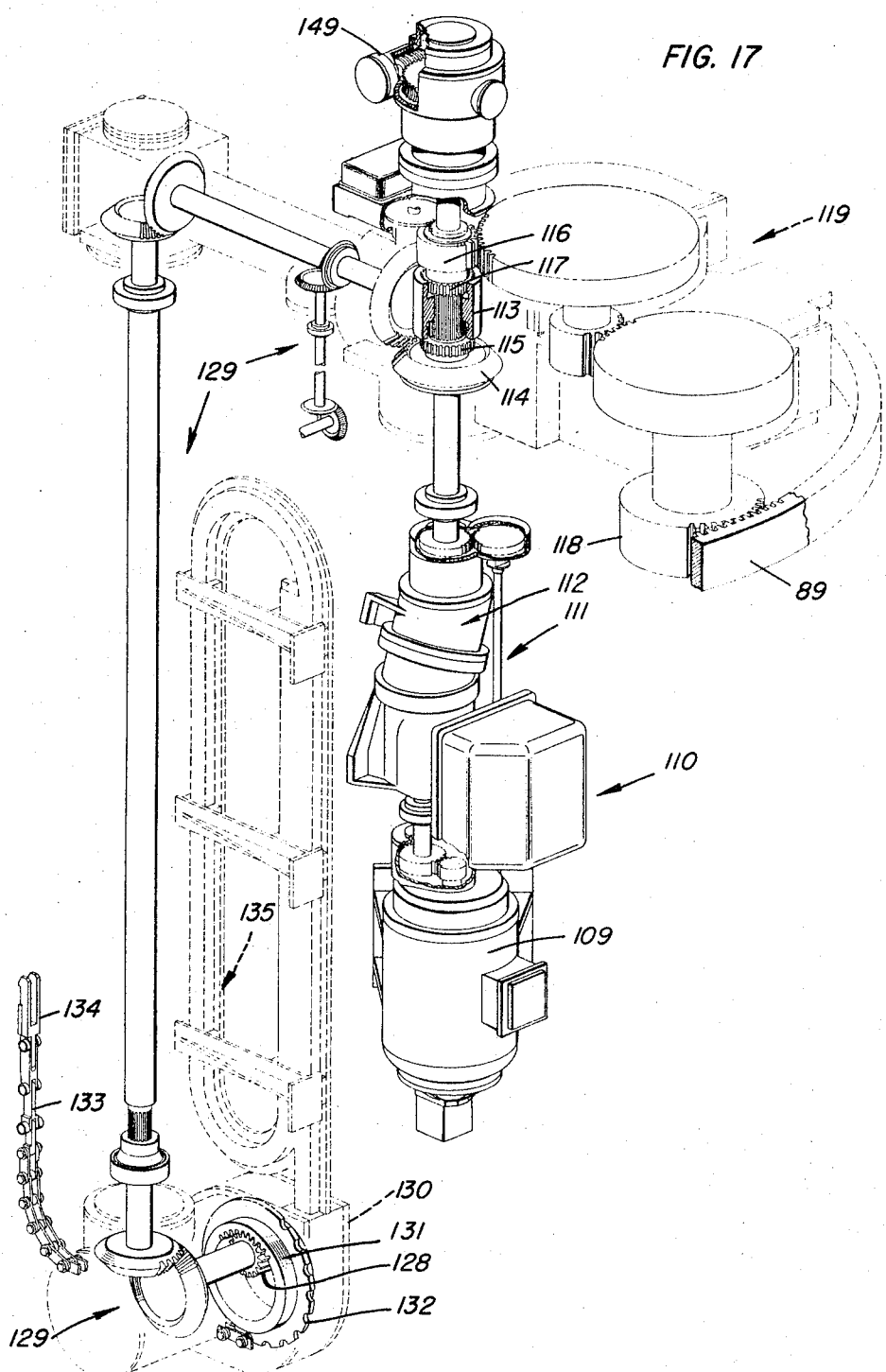

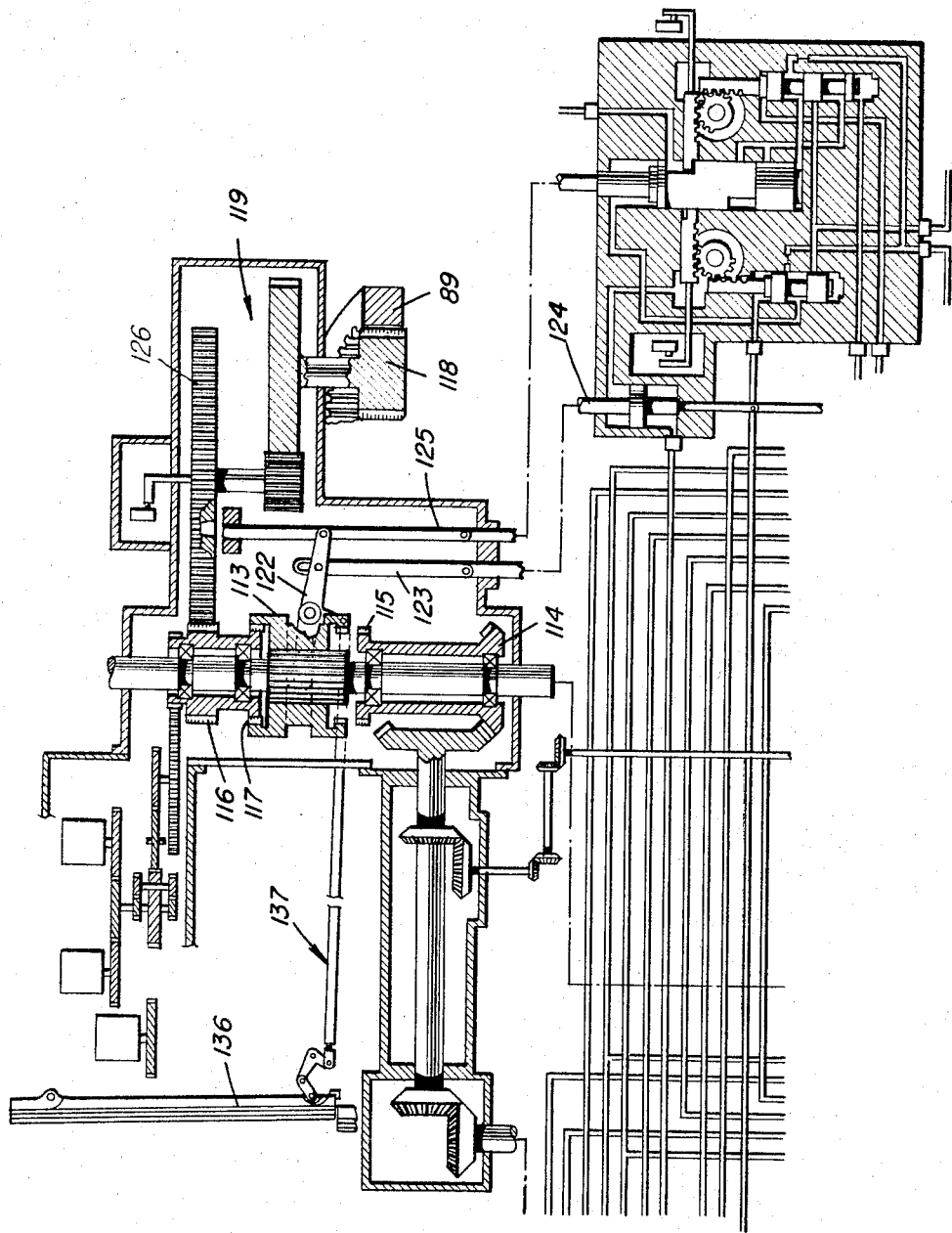

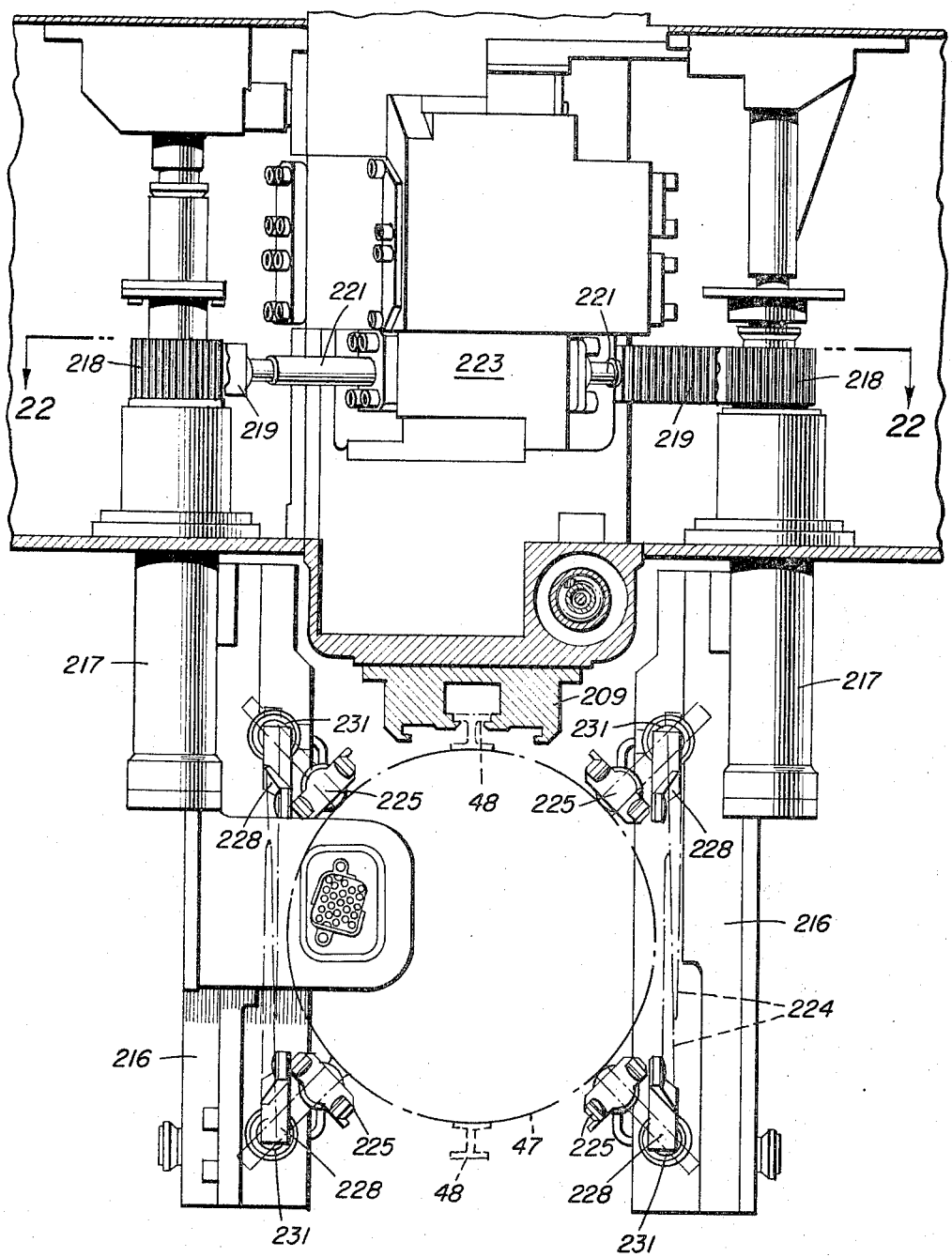

FIN OPENER RETRACTED   FIN OPENER EXTENDED

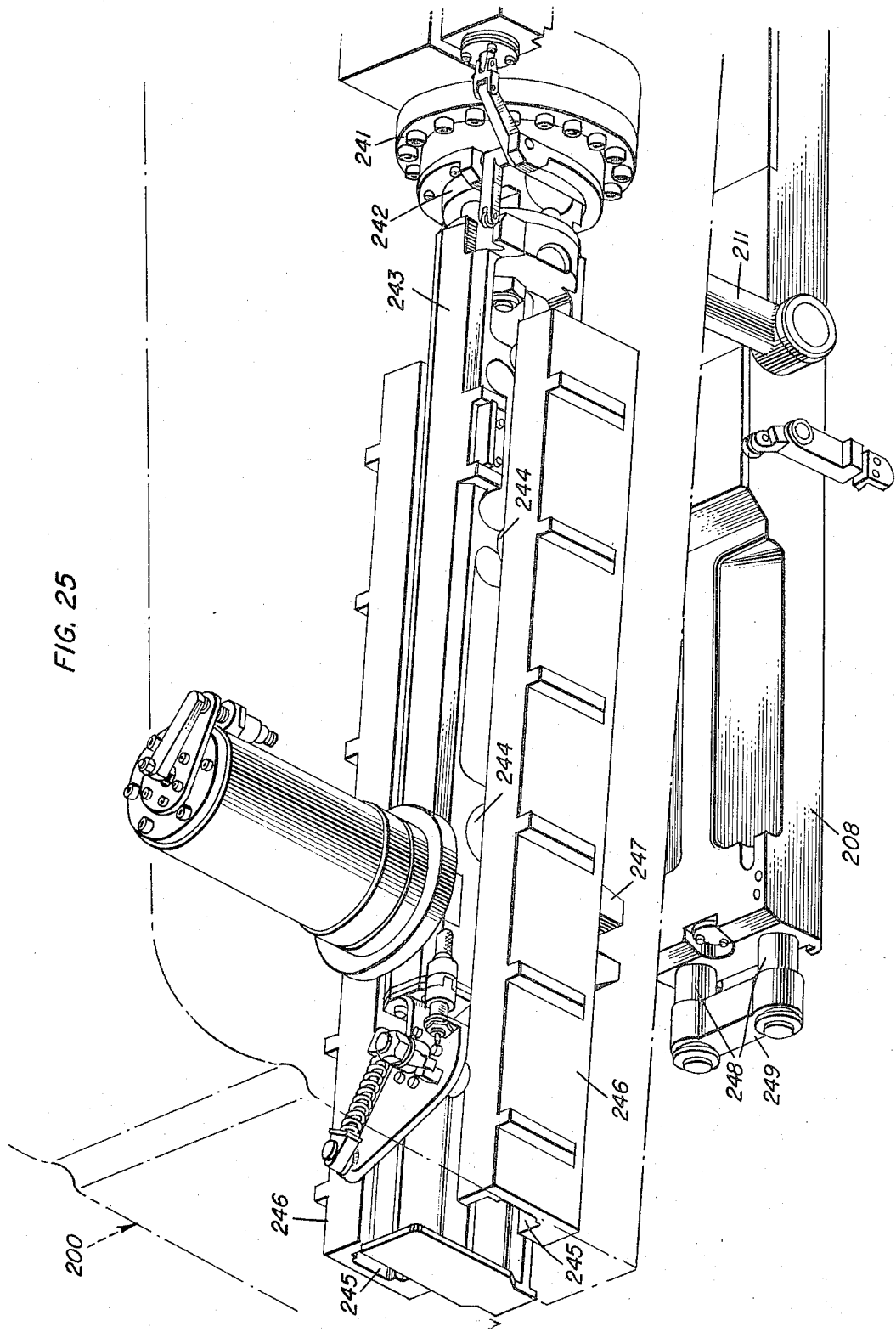

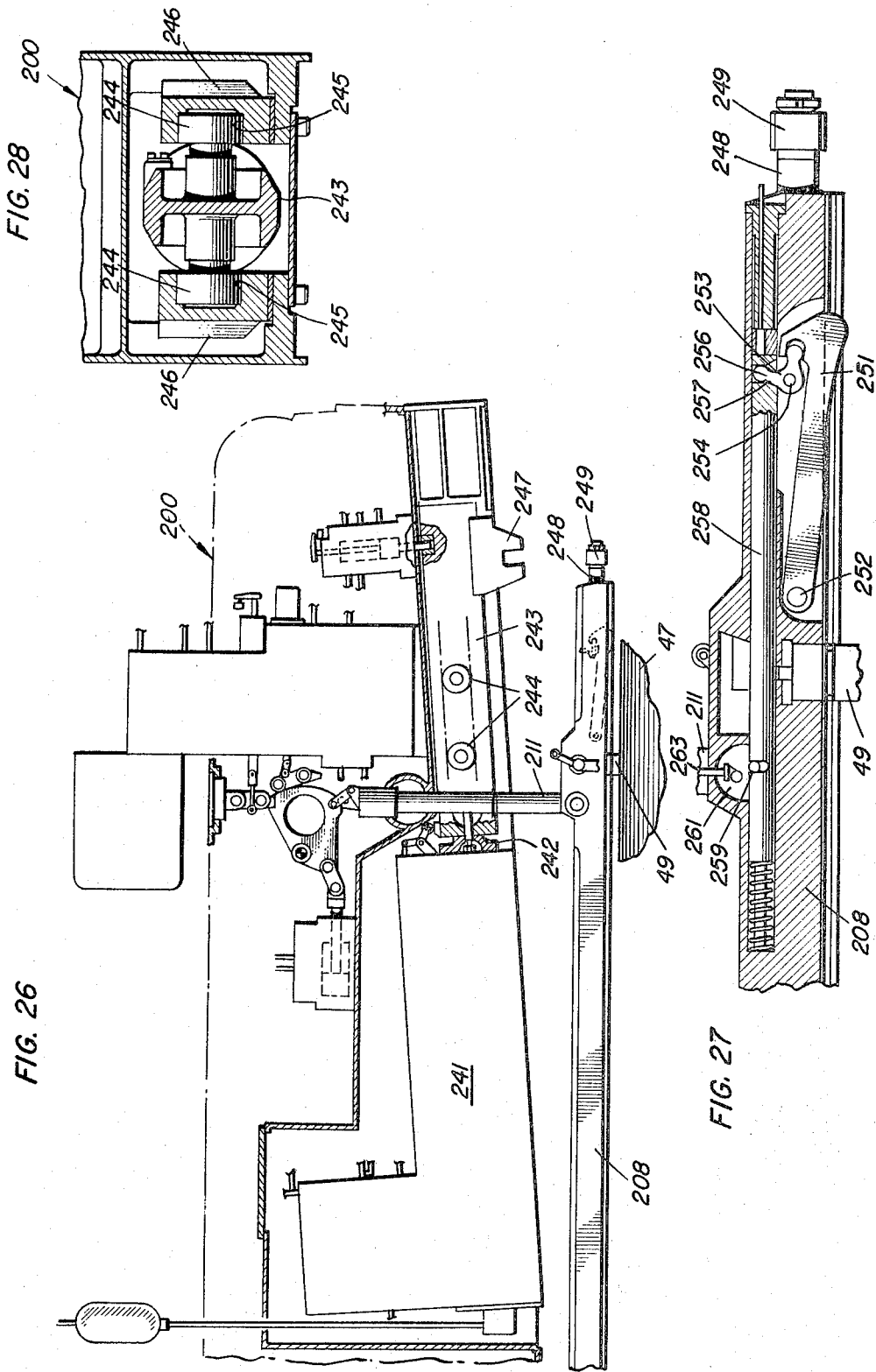

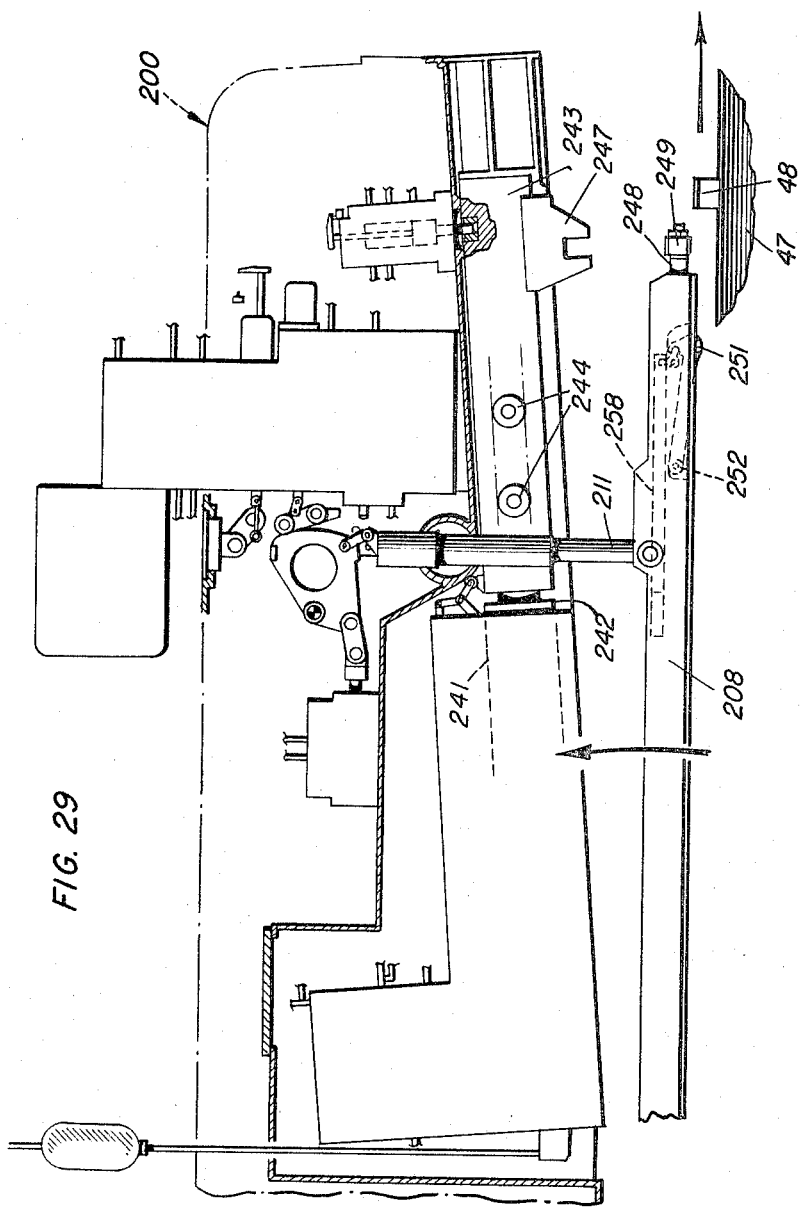

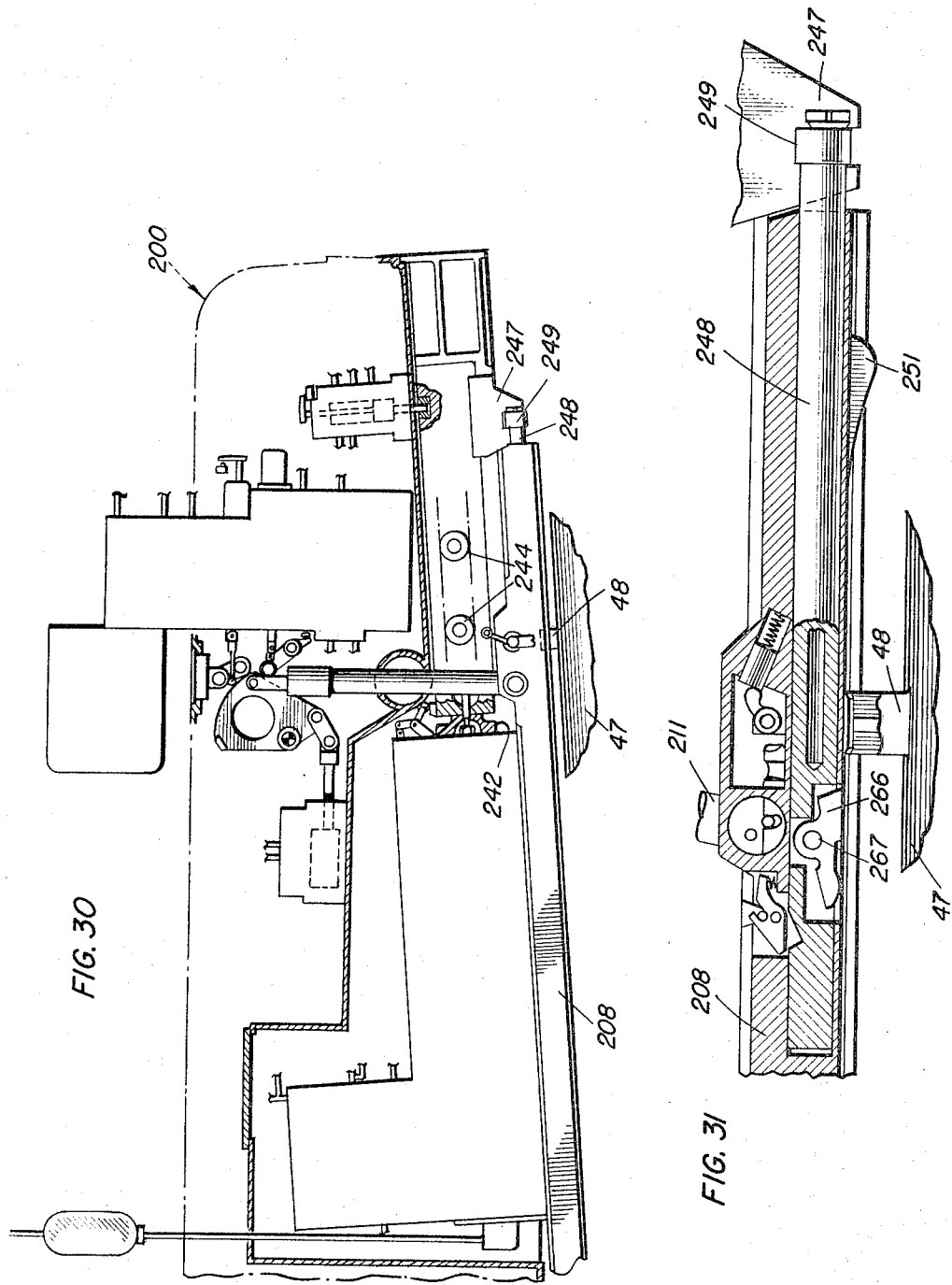

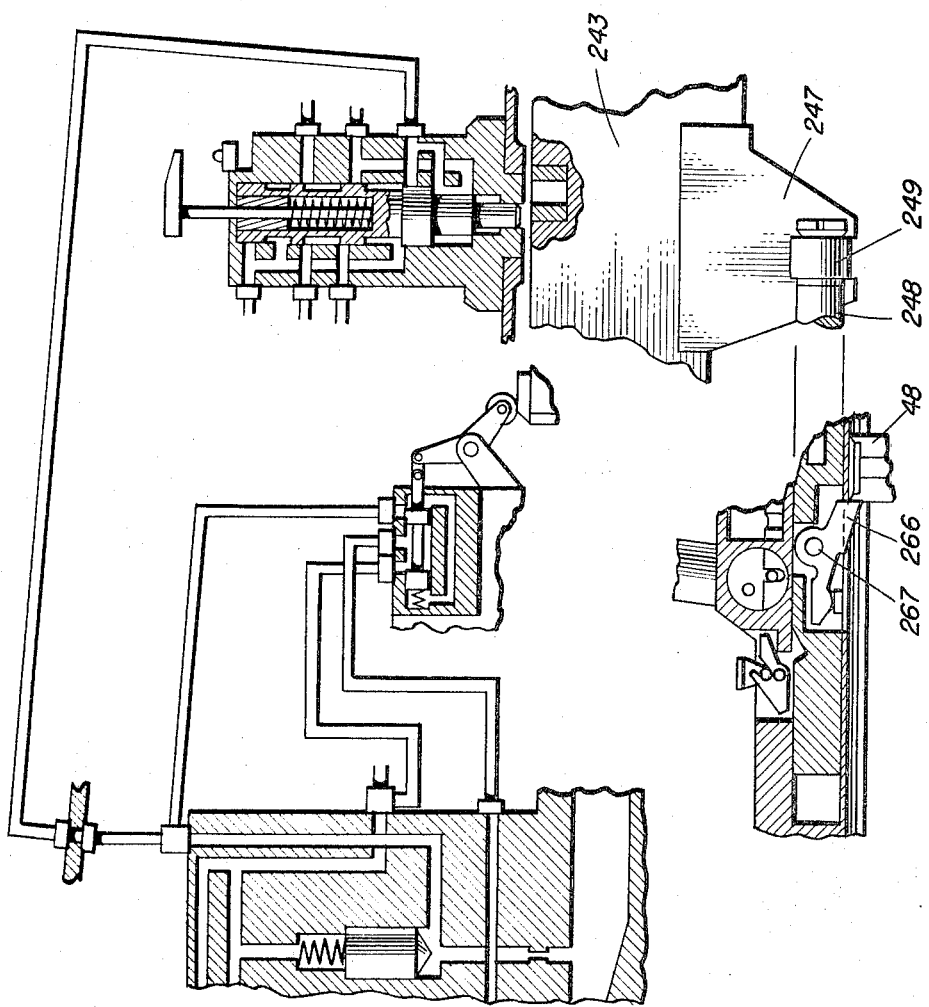

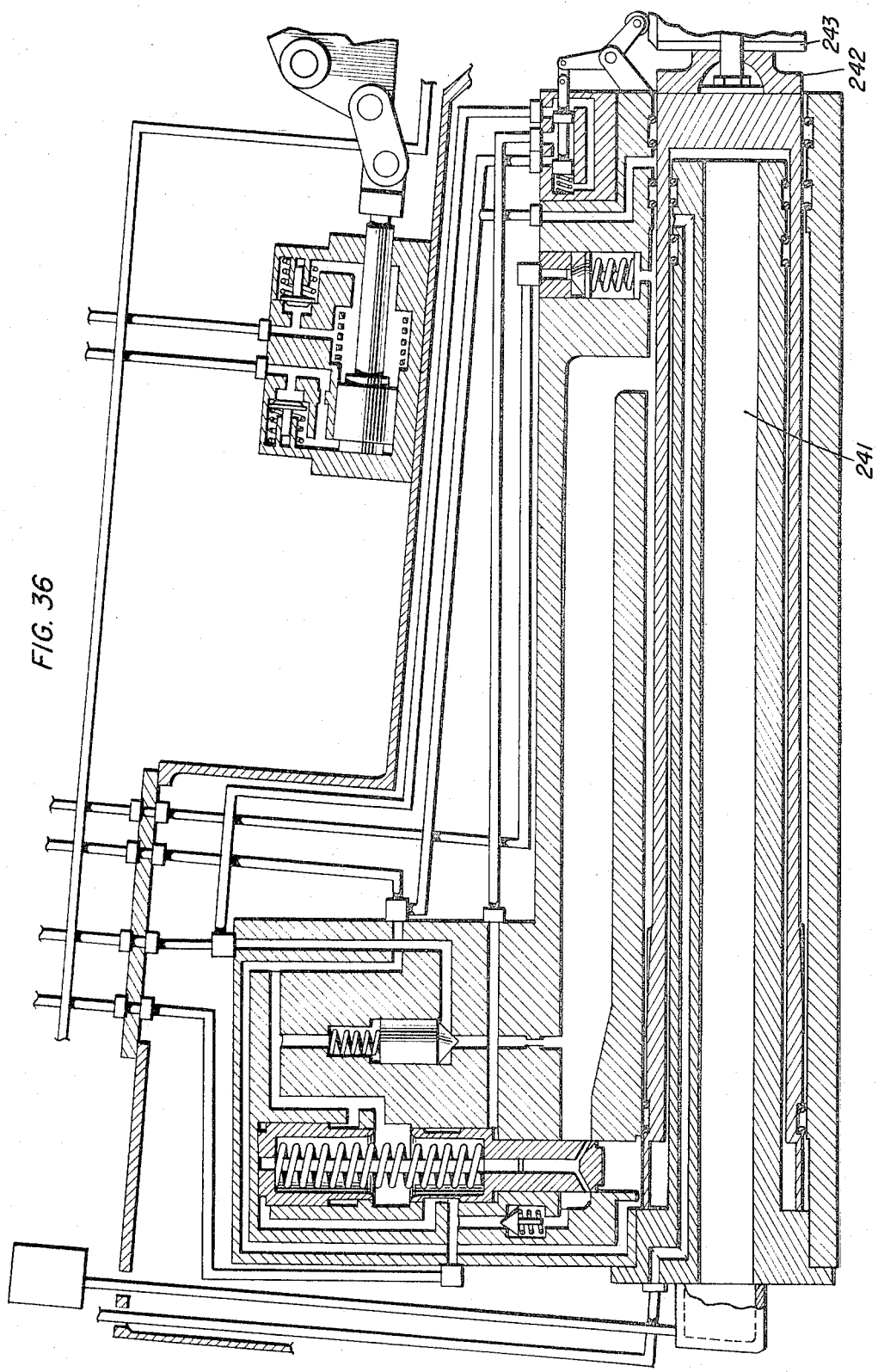

3,367,234
GUIDED MISSILE LAUNCHING SYSTEM
Milton C. Neuman and John S. Scheurich, Sr., Minneapolis, and Richard C. Wilson, Champlin, Minn., assignors, by mesne assignments, to the United States of America as represented by the Secretary of the Navy
Filed Oct. 5, 1965, Ser. No. 493,283
8 Claims. (Cl. 89—1.802)

ABSTRACT OF THE DISCLOSURE

A missile launcher having a magazine housing vertically supported missiles with a rotatable cover for the magazine. The rotatable cover carries a central post which depends into the magazine and has mounted thereon the missile hoisting mechanism and the elevating and training mechanism. The launcher arm is mounted on the rotatable cover and the arm, cover, the center post and its supported mechanism may be removed from the magazine as a unit.

---

This invention relates to a missile launching system of the type having the missiles stored in vertical positions in a magazine which supports the launching guide arm.

Missile launching systems including a magazine and a launcher guide arm are usually large installations which are custom built into the structure supporting them. They are generally constructed at a factory, assembled for tryout and then disassembled for shipment. After reaching their destination, they have to be again assembled. After assembly, they must be tested. This assembling, disassembling, again assembling and testing operation may take weeks or months of sustained effort. There is a need for a missile launching system that may be assembled completely, tested at the factory and then shipped in an assembled state to its destination where it may be set on a base prepared for it, a few connections made, as to hydraulic power and electricity, to have a missile launching system that is ready for action. Such a missile launching system must be capable of carrying a sufficient load of missiles in its magazine to make the operation worthwhile, yet at the same time it must be small enough to be transported on the ordinary means of transportation available. If it is to be transported by railroad, it must be designed to pass through tunnels and be sufficiently light to go over bridges. These factors of lightness and size, due to transportation difficulties, were factors in building a missile launching system that could be assembled at the factory and transported in the assembled state to its destination where with a very minimum of effort it could be readied for service. The value of such a missile launching system is that it need be assembled and tested only once before being ready for use.

The guided missile launching system which constitutes this invention comprises a single guide rail, two-axis launcher mounted on top of a cylindrical magazine containing a plurality of missiles stowed vertically in a circle concentric with the train axis of the launcher. With the guide arm supporting a missile to be loaded, the arm is moved to the vertical position. The missile is stored by positioning the launcher in train over a selected missile cell, whereupon the missile may be lowered into the cell. This arrangement provides a compact, unitized system having a high rate of fire for a minimum of space, weight and power demand. Except for the control panels located in a separate control room, all functional equipment is built into the launcher and magazine and operates automatically from the remote control station. The system affords long term stowage of missiles in a protected environment as well as rapid selection and firing.

This system is intended for installation on new, small ships which cannot carry a large system which must be custom installed. However, this system may be used on other ships or used with a ground installation.

The completely assembled basic launching system can be shipped on a railroad flat car and lifted from the car directly onto the ship's foundation structure. The control panels and the anti-icing heat exchanger which basically are part of the ship's structure can be conected to the launcher after installation.

All components of the system (except for remotely located control panels, heat exchanger unit and portable strike-down gear) form a package assembly which can be delivered to the installing activity and placed aboard ship as an integral unit and attached to the ship's structure on a single mounting ring. It has been determined that the missile launching system may be loaded on carriers such as railroads and transported from the point of manufacture to main shipbuilding ports without alteration of the carriers or tunnels or bridges.

It is therefore possible to assemble and test the system at the place of manufacture by the makers of the system and to ship such assembled system to the point of installation and to install without further tests.

The system is adapted to existing ships of the latest type with major structural alterations as well as to new construction and is suitable for either centerline or broadside installation. Flexibility in vertical positioning of the system may be achieved by appropriate relocation of the deck mounting flange.

The package nature of the system minimizes the time required for installation aboard ship. All adjustments and alignments are to be accomplished and verified by factory acceptance tests performed by the original manufacture. Post installation test will therefore be reduced to a minimum without jeopardizing shipboard performance. Electrical connections to the system are terminated at central locations permitting ready connection to external power and control sources. Similar centralized connection points are provided for other services to the system.

To avoid the use of complex mechanical devices and major parts involving precise machining, the launching system was designed with simplicity, both as to construction and replacement of parts. For example, a single power drive system is employed for both launcher train and magazine hoist functions, thereby effecting a substantial reduction in complex mechanism which would be necessary where these separate system functions to be served by individual drives. The extensive use of assemblies, subassemblies and component parts, previously manufactured for other systems, provides an interchangeability of parts for repair or replacement of parts after a predetermined use.

In the present launching system design, consideration was given to the adaption and incorporation into the system of principles and operating philosophies developed and proven to possess maximum reliability on other similar systems. The following features are considered significant with regard to equipment and personnel safety and operation reliability:

Fabrication of the magazine shell sides and top is of material that offers ballistic protection;

Flametight integrity of missile stowage areas under all operational conditions;

Fire deck base for center column area;

Provision for support and retention of forward missile shoes in the event the aft shoe restrainer becomes ineffective due to structural failure of the rocket motor case;

Plenum system to vent rocket blast in case of inadvertent missile ignition in the magazine;

Water injection, magazine sprinkling and carbon dioxide fire extinguished systems with means for either automatic or remote manual control;

Vents for safe release of pressure gases from the magazine;

Dud jettison device as integral assembly in the launcher guide arm;

Guard barriers, platforms and access ladders for protection of personnel during maintenance and servicing of the system;

Extensive use of hydraulic, mechanical and electrical interlocks to insure safety of launching system operation with regard to both personnel and equipment. These protective circuits and devices are so arranged as to provide maximum protection without detriment to system function or cycle time;

Ventilation of the central magazine compartment containing the center column with associated drives and controls;

Minimum exposure of rotating or other moving parts to reduce the possibility of personnel injury; and A high degree of accessibility to all parts of the system for inspection and maintenance.

In regard to equipment maintenance and in arranging system components, consideration has been given to the necessity for maximum accessibility to permit efficient performance of routine overhaul and replacement work. Access hatches and removable covers have been provided for personnel entry to the interior of the magazine and for removal of equipment. In order to facilitate overhaul operations of the type which might be required during extended shipyard availablity, the proposed system is so designed that the entire rotating assembly, including the center column on which all major systems power drives and controls are installed, may be vertically extracted from normal position within the stationary magazine structure and supported in an elevated and exposed position. It is estimated that the simplicity of the mechanical, hydraulic and electric connections which are necessary to be disconnected, should permit completion of the system separation in approximately 5–8 hours. Appropriate strips are provided for guidance of the rotating structure during extraction and reassembly.

In connection with a system of this magnitude there are many auxiliary requirements such as:

To insure maximum reliability of missile performance it is necessary to air condition the missile compartment from some external source. The magazine chamber is therefore insulated and duct work is provided to accommodate circulation of conditioned air. Under standby conditions, missile warm-up and heat transfer from the center machinery compartment generate a predictable heat load. Aside from such loads, solar loads and temperature conditions in adjacent below deck compartments must be considered which may vary with different installations.

Anti-icing of the launcher base ring water seal, blast door and the launcher guide arm-trunnion support areas is accomplished by the circulation of heated fluid through passages within or in contact with the areas to be maintained ice-free.

An outside source of nitrogen is required for use in charging the dud jettison device, the launcher power drive accumulator and the train and servo pressure accumulators;

A salt water supply from the ship's main fire system is required for the sprinkling heads in case of fire in the magazine or inadvertent ignition of one of the missiles; and Provisions for suitable drainage of the plenum and air conditioning supply and exhaust ducts are necessary.

The structure of the system may be divided into non-rotating structures, rotating structures and off-mount components.

The non-rotating structure, which is the magazine, is made up of the stand, upper center section, lower center section, bottom section and the magazine base.

The stand consists of two concentric rings flanged together at the top by cross braces. The inner ring contains the train circle and the train circle bearing. The bearing is of the contact ball type with radial and thrust capacity to take both lateral and vertical loads. The outer concentric shell of the magazine is constructed of ballistic material. The bottom flange is radially cut-out to clear the missile. The peripheral portion of the stand is provided with a small cover plate for access to the main magazine sprinkling valve which must be tested periodically.

The upper and lower center sections are essentially the same in basic design and differ in that the upper section is slightly shorter in height and includes the system mounting flange. These sections consist of cylindrical outer shells having openings to permit access to each missile cell.

Circumferentially, the missile cells are separated by radial bulkheads that contribute to the strength and rigidity of the magazine and isolate the compartments.

The bottom section has compartments similar to those of the upper and lower center sections. The inside concentric ring has openings to the center column area that are sealed off by a rotating sheet metal skirt. This type of structure is necessary so that the rotating hoist chain pawl may be extended through the openings in the fixed structure to engage the aft shoe of the missile selected for hoisting. In case of inadvertent ignition of a missile while stored in the magazine cells, the base of this section is fitted with safety blow-out plates which vent the missile exhaust to the plenum chamber. The base of this section consists of two concentric flanges, which in conjunction with the top of the plenum, form a duct for the cell air conditioning system. Water sprinkling as well as carbon dioxide connections from the ship's supply are made through the periphery of the bottom section.

It will be noted that the four magazine sections described above form the individual missile cells. The missile is fitted with two forward and two aft shoes, respectively, located 180° apart for handling purposes. The missile is vertically supported at the outside aft shoe by a hard receptacle located in the bottom magazine section. Both forward shoes are supported by resilient receptacles located at the flange joint between the upper and lower center sections. On the inside wall of each cell there is a combination hoist chain and missile shoe guide track that is in line with the inside aft missile shoe. The fixed track sections extend part way into the stand section. Above this point, a single track section is attached to the rotating structure which aligns with the cell sections when the mount is rotated to the selected missile cell. The combination of the fixed and rotating track sections provides guidance for the shoes and hoist chain up to the base of the blast door.

Both the forward and aft magazine shoe receptacles are provided with missile restraining latches that retain the missile under shock loads or in the event of booster ignition in the magazine. As previously noted, the missile is vertically restrained in the magazine cell by the support provided for the aft outer shoe. If the rocket case were to split in two pieces due to fragment ignition, the upper half of the missile would be restrained by a second vertical support incorporated in the outside forward shoe receptacle.

The base of each missile cell compartment includes a warm-up contactor which automatically plugs into the warm-up receptacle on the base of the missile when it is lowered into the cell. This electrical connection with the missile also provides a cell loaded indication to the control panel which indicates which missiles are on warm-up.

The base of the magazine forms a plenum chamber below the magazine structure and is intended to route inadvertently ignited missile blast gases from the cell exhaust cones to the atmosphere through an exhaust stack, furnished by the shipbuilder for connection to the rectangular opening provided on the side of the magazine base. The exhaust cones are fitted with circular blow-out discs through the center of which projects the injection water system standpipe. In the head of the standpipe is a detector nozzle that opens almost immediately should ignition of the missile occur. A high pressure stream of water is directed into the end of the booster to control the burning of the rocket fuel. There must be drains connected from the bottom of this section to carry off the injection water. The magazine base also includes a watertight fire deck to enclose the center machinery compartment. All electrical and anti-icing fluid connections to the launcher as well as all ventilation duct connections are made through this deck. Also included in this deck is a personnel access hatch.

The rotating structure of the missile system consists of the guide, carriage, train/hoist power drive, and the elevation power drive. The rotating structure is bearing mounted to the stand and forms the top of the magazine. The train axis of the rotating structure is concentric with the vertical centerline of the magazine so that the launcher may be positioned to receive missiles from any of the magazine cells.

The carriage assembly includes the trunnion supports, the base ring, center column, service platform, skirt adapter, slip ring, launcher power drive and train and elevation fluid supply tanks.

The trunnion supports are not identical. The right hand support contains the elevation and depression buffer assembly and mounts parts of the elevation drive train. The left hand trunnion support contains flexible hoses for launcher guide hydraulic and anti-icing circuits and cabling for guide electrical circuits. Both of the trunnion supports have anti-icing provisions on their inside faces.

The base ring is the major element of the rotating assembly. It mounts the trunnion supports on top, forms the top of the magazine on which it is bearing mounted, and supports the center column structure. Included in the base ring are the blast door, the personnel access hatch, magazine safety blow-out plates, a section of the hoist rail, and the guide arm accumulator unit. The square blast door is mounted at one corner to a vertical shaft. The door is opened by raising it a short distance and then rotating it 90°. A short section of hoist rail on the edge of the door aligns between the aft end of the launcher guide and the top of the magazine rail in the base ring. This latter rail section is pivoted at its top mounting and has a sliding pin to align it with the top of the magazine rail to which the launcher is positioned. The launcher power drive consists of an electric motor, pump, valve block, accumulator, and supply tank which provides hydraulic fluid at 1500 p.s.i. to the guide components, blast door drive and hoist controls.

The center column extends from the underside of the base ring down through the center of the magazine. It supports the train/hoist power drive, the elevation power drive, and the hoist. A skirt adapter is attached to the bottom of this column which provides rotational drive to the skirt to match rotation of the base ring.

The skirt adapter and skirt occupy the center space of the magazine bottom section. The skirt is essentially a cylindrical shell bearing mounted at its top to the inner top flange of the bottom magazine section. It serves to seal off the inner openings at the bottom of the missile cells so that the conditioned air in the cells is isolated from the ventilating air in the center space. At one location on its circumference, the skirt mounts the hoist chain pawl housing assembly. One removable panel on the skirt affords access to the bottom of the missile cells for servicing the components therein. The skirt adapter extends down through the skirt to mount the slip ring. A main supply tank for the train/hoist and elevation power drive is built into the skirt adapter. It also mounts the hoist speed reducer and sprocket.

The slip ring assembly makes electrical connections between the non-rotating and rotating structures. It also includes slip joints for passage of anti-icing fluid that is supplied from a heat exchanger located outside the launching system.

The elevation power drive consists of an electric motor driven hydraulic transmission, a receiver regulator, auxiliary servo and super-charge supply, power-off brake, and a gear reducer. The electric motor and hydraulic transmission are mounted on the center column and the receiver regulator is mounted on the variable displacement pump of the hydraulic transmission. The power-off brake and part of the gear reducer are located in the base ring and the final gear reduction is in the right-hand trunnion support. The receiver regulator controls the hydraulic transmission from remote synchro orders and contains elements of the automatic tracking cut-out and firing cut-out system which in conjunction with similar elements in the train regulator, prevents the launchers from pointing into or firing into areas designated as unsafe.

The train-hoist power drive consists of a single electric motor driven hydraulic transmission with separate controls and gear reducers for either powering the launcher on train or driving the hoist. This dual purpose drive is advantageous from a standpoint of equipment economy as well as space consideration since the launcher must be latched in train when hoisting and the hoist must be retracted and latched when the launcher is trained. A train-hoist selector effects a shift from one gear to the other and also engages the corresponding control.

The electric motor, pump and gear reducer and the hydraulic transmission are mounted on the center column. The train receiver regulator is mounted on one side of the variable delivery pump of the hydraulic transmission and the hoist control is mounted on the opposite side. The train receiver regulator is similar in design and function to the elevation receiver regulator. The output of the hydraulic transmission is coupled to a speed reducer and drive clutch mounted in the base ring. This unit contains the train reduction, train latch, a train synchro attachment, power-off brake, and a shift clutch for shifting from train drive to hoist drive. A response gear on the hoist drive shaft is coupled to the hoist control while the main drive is coupled by a long torque tube to the hoist speed reducer and sprocket located in the skirt adapter.

When shifting from train operation to hoist operation, the launched must be synchronized to a position directly over the selected cell and when the transmission stroke is on neutral the train latch is extended. The shift clutch is actuated by the train latch to disengage the train drive and engage the hoist drive. The linkages are arranged to cause the train latch to engage before the clutch shifts. Separate linkages attached to the train latch extend the aligning pin in the hoist track and shift a transfer valve which switches the stroke control of the transmission from the receiver regulator to the hoist control. One-tenth of a second after the train latch starts to extend, the hoist pawl extend piston is actuated so that both the latch and the pawl will finish extending at the same time. This time delay assures that the train latch is partially engaged before the pawl extends and conversely the pawl must fully retract before the train latch disengages. This precludes physical damage to the chain pawl mechanism. After the pawl is extended, the hoist and missile latches are retracted and the hoist control is then able to control the transmission to drive the hoist chain. Separate interlocks in the control assure that the blast door is latched open and the elevation brake is set. In shifting back to train, the reverse sequency of events takes place.

The launcher guide consists mainly of the guide arm and the guide arm supports. Its function is to support single missiles for launching, jettisoning, checkout, strikedown, or off-loading and serves as a mount, a support and a weather-proof housing for various electrical, mechanical and hydraulic components. It is separated for explanation into the guide structure and the guide components.

The launcher guide which is a steel weldment has several integral parts; a head tank, the fluid lines and the mounting surfaces. The rectangular section of the weldment is referred to as the guide arm. The guide arm supports and houses the various launchers components that facilitate electrical and mechanical contact with the missile. The U-shaped section of the weldment is the guide arm yoke and supports the entire guide weldment by means of two spud shafts that pivot on bearings within the trunnion supports. Through the trunnion supports, elevation movement is mechanically transmitted to the launcher guide. A tank for hydraulic fluid is provided at the forward end of the guide arm.

The main components of the guide arm comprises the rails and rail operating mechanism; an elevation positioner; and aft motion latch; a pawl retainer; the forward motion latch and lock; the arming tool mechanism; the igniters and guide cams; the main valve block and solenoids; the fin openers; the electrical contactor; the jettisoning device; the header tank for hydraulic fluid; mechanism for providing anti-icing; and other structures such as cables, hydraulic piping, access covers, switch covers and other necessary pieces of equipment all of which are hereinafter explained.

The launcher guide has tracks or rails for the hoist chain and missile shoe for receiving and launching the missile, aft and forward motion shoe restraining latches, a retractable guide rail (this rail is retracted after 20 inches of guided travel, to assure free flight of the missile, the arming tool, igniter contacts, fin opener and missile contactor unit and a dud jettisoning mechanism.

The missile launching control system located in a separate control room, includes a power panel, a control panel, and a test panel. A separate hand control is furnished for operating the launcher from the deck during strikedown.

The strikedown equipment consists of a portable air driven chain drive and control which is attached to the front end of the launcher guide in alignment with the launcher guide rail. It extends a chain through the guide rail and into a missile transfer dolly which is connected to and aligned with the guide. A latch on the end of the chain engages the forward shoe of the missile so that the chain may be retracted to pull the missile from the dolly onto the guide. It will also operate in reverse to return a missile from the guide to the dolly.

Anti-icing fluid is pumped from a heat exchanger unit mounted separately on the ship's structure, to the launcher and top of the magazine through the slip ring assembly. The heated mixture of water and ethylene glycol is circulated through those areas of the launcher and magazine top which are to be protected from the formation of ice. Heat is supplied to the exchanger from the ship's steam supply which enters through a regular valve control by the temperature of the anti-icing fluid returning from the launcher.

A duct arrangement provides for the continuous distribution of conditioned air supplied to the magazine cells from the ship's air conditioning equipment. Supply and return openings to the concentric ducts above the plenum chamber are connected to alternate missile cells to provide efficient air circulation. Ventilation of the center column space is assured at any rotational position by blowing the inlet air through a slip connection around the electrical slip ring housing and collecting the return air at the magazine base.

Sprinkler heads are located at the top of the magazine structure in a position to spray water into each of the missile cells when triggered by automatic rate-of-rise temperature or fixed temperature actuating devices connected to a sprinkling system. Manual actuation of this system may also be accomplished at either a local or remote control panel. A carbon dioxide fire extinguishing system is also provided in the center column and magazine areas for additional protection.

Normal operation of the launching system is controlled entirely by personnel manning the panels which are part of the launching system but which are not located in the magazine area or on the launcher structure. No operating personnel will be stationed in the magazine or on the launcher. The control panels are two in number; the Power Panel and the Launching System Control Panel.

The Power Panel contains circuit breakers, switches, fuses for the control supply system and the switches and fuses for the warm-up supply.

The Launching System Control Panel contains all the necessary controls to launch the missile.

It is an object of the present invention to provide a complete missile storage and launching system which is so designed that it may be assembled and tested at the factory and shipped to its destination as a unit on the present carrier system including railroads without alteration of the carrier or the right of way.

It is a further object of the present invention to provide a system which may be assembled at the factory and shipped as a unit for installation to either a stationary base or to a mobile base such as a ship.

It is another object of the invention to provide a complete system (except for remotely located control panels, generators for eletcricity and hydraulic power units) which can be delivered to the installing activity and placed aboard ship as an integral unit and attached to the ship's structure on a single mounting ring.

It is a further object of the invention to provide a system which is adapted to existing ships of the latest type without any major structural change or new installation and which is suitable for either centerline or broadside installation.

It is a further object of the present invention to provide a complete system which has considerable flexibility in vertical positioning with respect to the support foundation surface by relocation of the deck mounting flange and which is so designed that this relocation may be accomplished with the least amount of alteration of the ship.

It is a further object of the present invention to minimize the time required for installation aboard ship by making all adjustments and alignments necessary and possible of accomplishment at the factory and to perform such tests on this package equipment as to make additional tests after installation unnecessary thereby eliminating most tests and reducing the few others to a minimum.

It is a further object of the present invention to provide terminations for electrical connections at a central location permitting ready connection to external power and control panels.

It is a further object of the present invention to provide external, easily located connections for outside service such as air conditioning, water and carbon dioxide sources, compressed air and hydraulic power sources, so that the packaged unit may be installed with the minimum of work at the installation point.

It is a further object of the present invention to avoid complex mechanical and parts involving precise machining and to combine and use a single power source for a number of functions, for example, a single power drive system is employed for both the launcher train and the magazine hoist functions thereby effecting a substantial reduction in complex mechanisms which would be necessary where these functions served by separate power units.

It is a further object of the present invention to make use of separate assemblies and sub-assemblies which may be replaced as units, assembbled and tested at the factory, which units may be carried as replacemant parts for rapid and comparatively easy installation.

It is a further object of the present invention to provide a stationary magazine having a plurality of missile cells located in a circle adjacent the outside shell.

It is a further object of the present invention to form the outside shell and the top of the magazine of a material that offers ballistic protection.

It is a further object of the present invention to provide a magazine being completely flametight under all operating conditions.

A further object of the present invention is to provide for support and retention of forward missile shoes in the event the aft shoe restrainer becomes ineffective due to structural failure of the rocket motor case.

It is a further object of the present invention to provide a plenum system to vent rocket blast gases in case of inadvertent ignition of the missile while in the magazine.

It is a further object of the present invention to provide a means for water injection and magazine sprinkling as a safety factor in case of fire or inadvertent missile ignition.

It is a further object of the present invention to provide a carbon dioxide fire extinguishing system to be used in conjunction with the water system in case of fire or inadvertent missile ignition and to provide automatic control or remote manual operation for the carbon dioxide system.

It is a further object of the present invention to provide vents located within the shell of the magazine for the safe release of any gases under pressure within the magazine.

It is a further object of the present invention to provide guard barriers, platforms, access ladders, hatches at desired locations for protection of personnel and for repair and maintenance.

It is a further object of the present invention to provide hydraulic, mechanical and electrical interlocks to insure safety of the launching system operation with regard to both personnel and equipment and to so arranged these circuits and interlock devices that maximum protection is provided without detriment to system function or cycle time.

It is a further object of the present invention to provide ventilation of the magazine compartment at all times so that there is no time that access cannot be readily had to the inner compartment of the magazine.

It is a further object of the present invention to provide connections for such equipment as of necessity has to be supplied to the system from an outside source, such as an air conditioning system, steam lines to provide for anti-icing, compressed air for operation of certain parts such as the strike-down hoist, nitrogen which is required for charging the dud jettison device, the launcher power drive accumulator and the train and elevation servo pressure apparatus, and water for fire control and drainage ducts.

A still further object of the present invention is to provide a substantially cylindrical stationary magazine which serves as a base for a rotatable cover for that magazine, and to position and support components such as the guide arm and its components, and the training and elevating mechanisms, as well as the hoisting mechanism from the rotatable cover in order that the cover and all of its supported mechanisms may be removed from the magazine as a unit.

It is a further object of the present invention to provide a launcher arm which is mounted on a rotative structure which forms the top of the magazine and has a train axis which is concentric with the vertical center line of the magazine so that the launcher may be positioned to receive missiles from any one of the magazine cells.

It is a further object of the present invention to provide a guide arm having within its structure, rails which are alignable with the rails of the magazine, an arming device for the missile, aft and forward motion latches for missile retention on the guide arm, igniter contacts, fin opener for the folded fins of the missile, and a missile contractor unit and a dud jettisoning device.

It is a further object of the present invention to provide a carriage assembly including the trunnion support for the launcher arm, a base ring, a center column, a service platform, a skirt adapter, a skirt, a hoist, a slip ring, a launcher power drive and train and elevation fluid supply tanks.

It is a further object of the present invention to provide right and left trunnion supports, the right support containing the elevation and depression buffer assembly and parts of the elevation drive train, the left support containing flexible hoses for the launcher guide arm, hydraulic and anti-icing circuits and the electrical cabling for the guide arm electrical circuits.

It is a further object of the present invention to provide a base ring for supporting the rotating structure.

It is a further object of the present invention to provide a base ring and a top cover plate which includes a blast door, a personnel access hatch, a machinery hatch, a magazine safety blow-out plate and a section of the hoist rail.

It is a further object of the present invention to provide a center column which extends from the underside of the base ring down through the center of the magazine and supports the train/hoist power drive, the elevation power drive and the hoist.

It is a further object of the present invention to provide a skirt adapter and a skirt which occupy the center space of the magazine bottom section and serve to seal off the inner openings at the bottom of the missile cells so that the conditioned air in the cells is isolated from the center space.

A further object of the present invention is to provide a slip ring which makes all the electrical connections between the rotating and the non-rotating structure and includes slip joints for passage of anti-icing fluid.

A further object of the present invention is to provide an elevation power drive which consists of an electric motor driven hydraulic transmission, a receiver regulator, an auxiliary servo and super-charge supply, a power-off brake, and a gear reducer.

It is a further object of the invention to provide a train/hoist power drive which consists of a single electric motor driven hydraulic transmission with separate controls and gear reducers for either powering the launcher in train or for driving the hoist chain.

It is a still further object of the present invention to provide means for latching the launcher in train when the power drive is to be used for hoisting and for retracting the hoisting apparatus when the launcher is to be trained.

It is a further object of the present invention to provide means for mounting the electric motor, pump and gear reducer on the center column and to balance the weight of these mountings so that the rotating structure may be efficiently operated.

It is a further object of the present invention to provide means for synchronizing the launcher when shifting from train to hoisting operation so that the launcher is directly over a selected cell at the time the hoist is called into operation and to so couple the train latch that it will actuate the shift clutch and engage the hoist drive.

It is a further object of the present invention to provide a remotely located control panel which is connected to control all of the operations of the launcher system which are not automatic controls.

It is a further object of the present invention to provide a missile launching system which has a non-rotating section and to provide for the easy separation of the rotating section from the non-rotating section for the purpose of maintenance and replacement of parts.

Other objects, advantages and novel features of the present invention will become apparent from the following detailed description of the invention when considered in conjunction with the accompanying drawings wherein:

FIG. 1 is a pictorial view of the missile launcher;

FIG. 1a is a pictorial view of the missile launcher, in transportation, on a railway flat car;

Figure 2A:
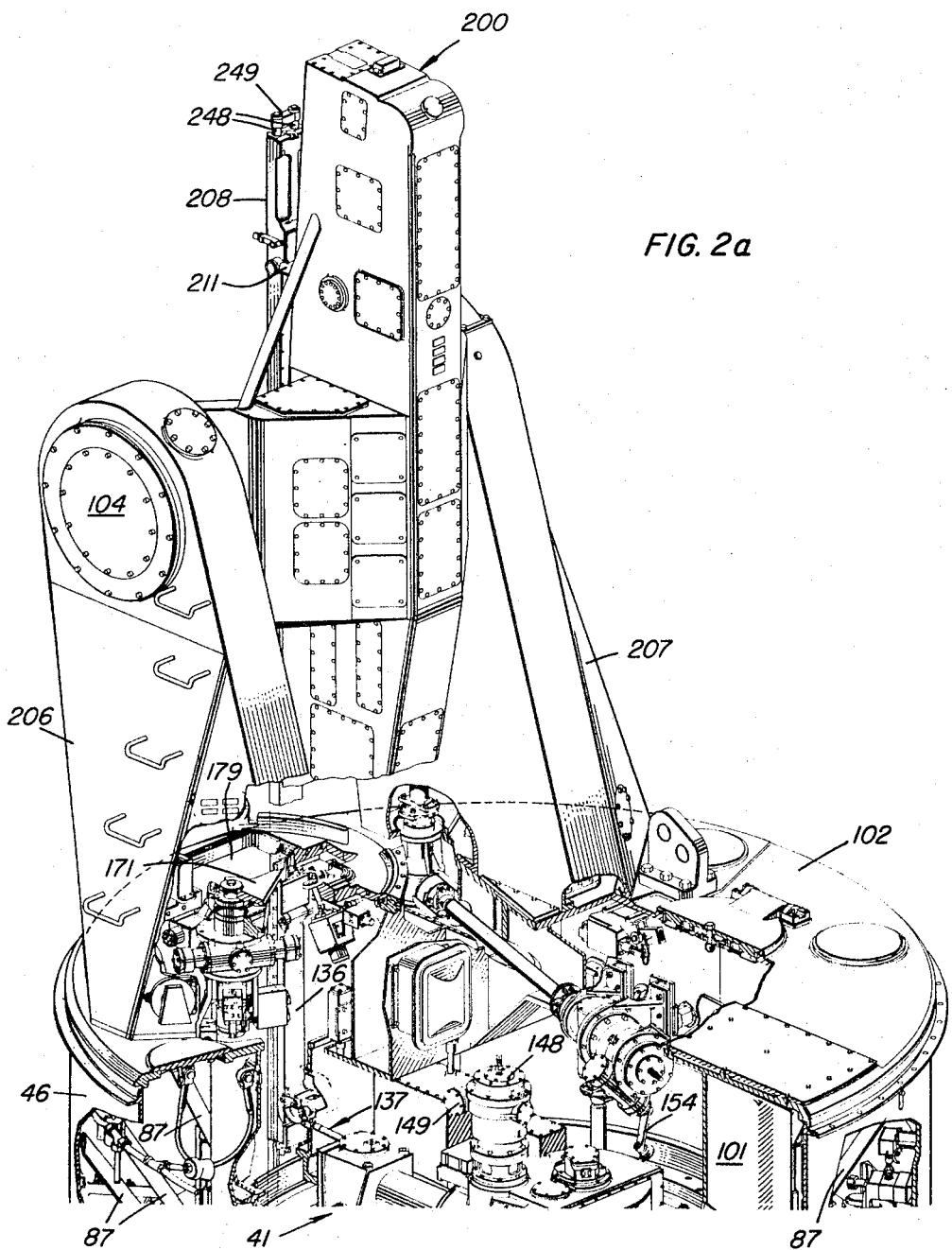
Figure 3:
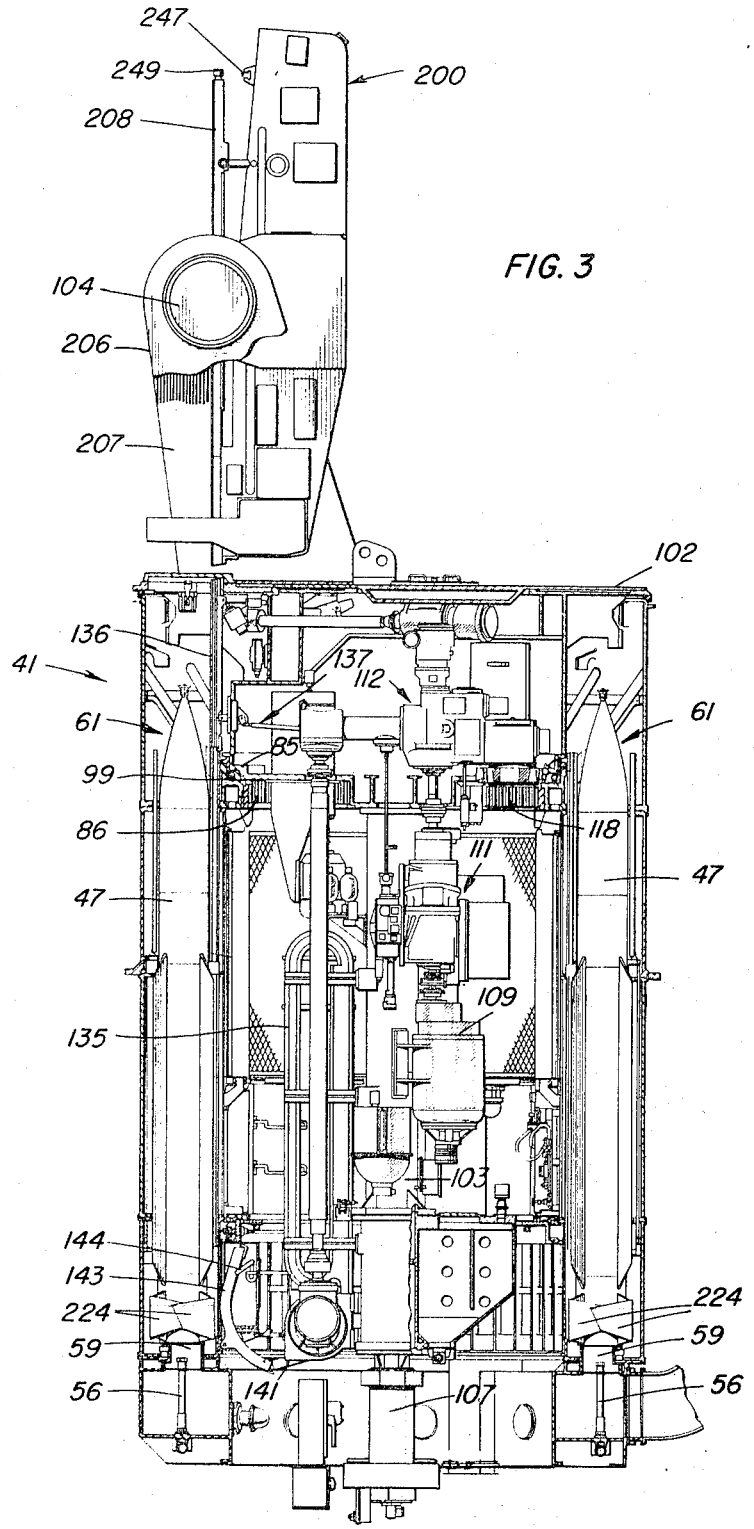
Figure 4:
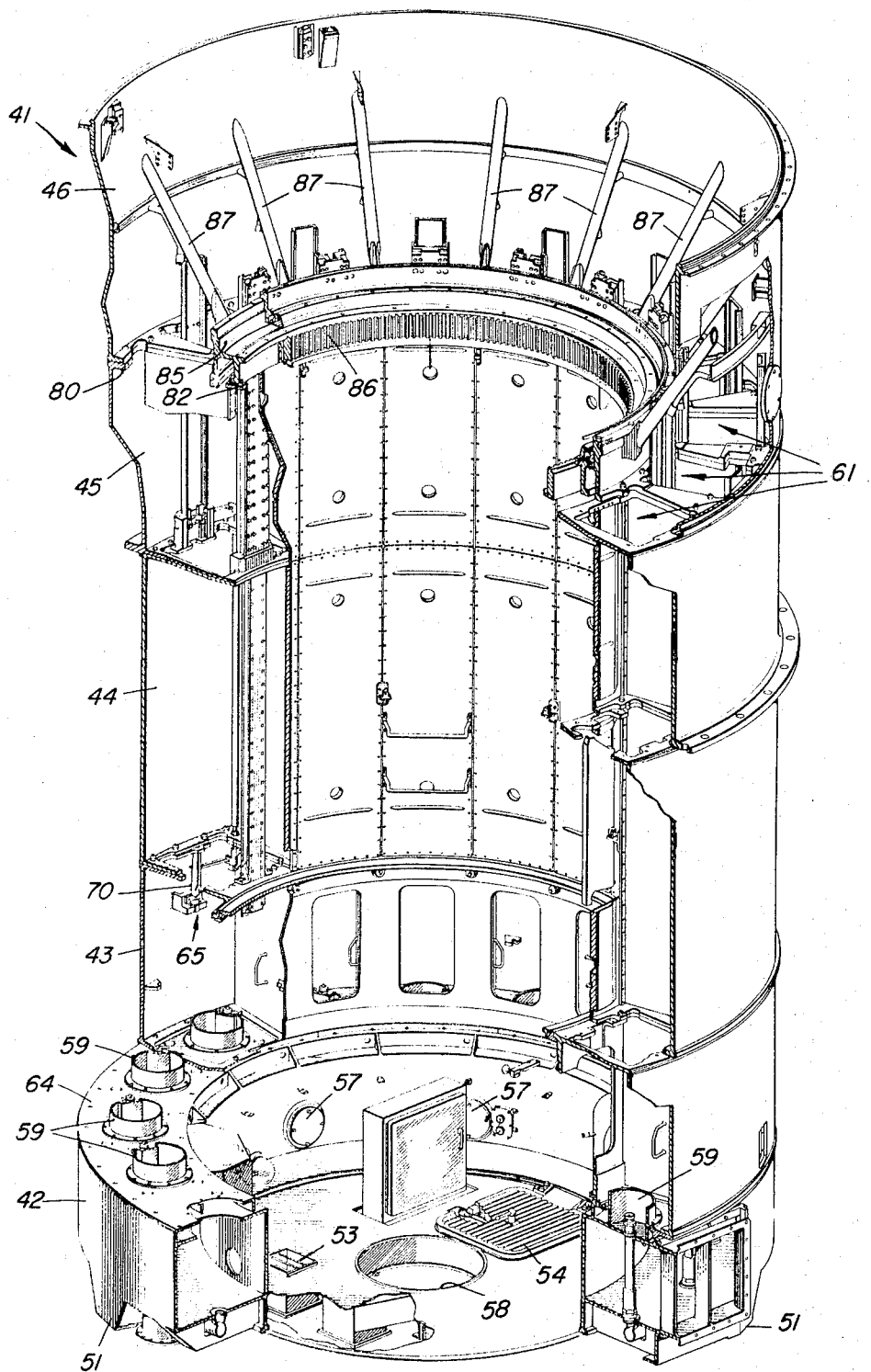
Figure 5:
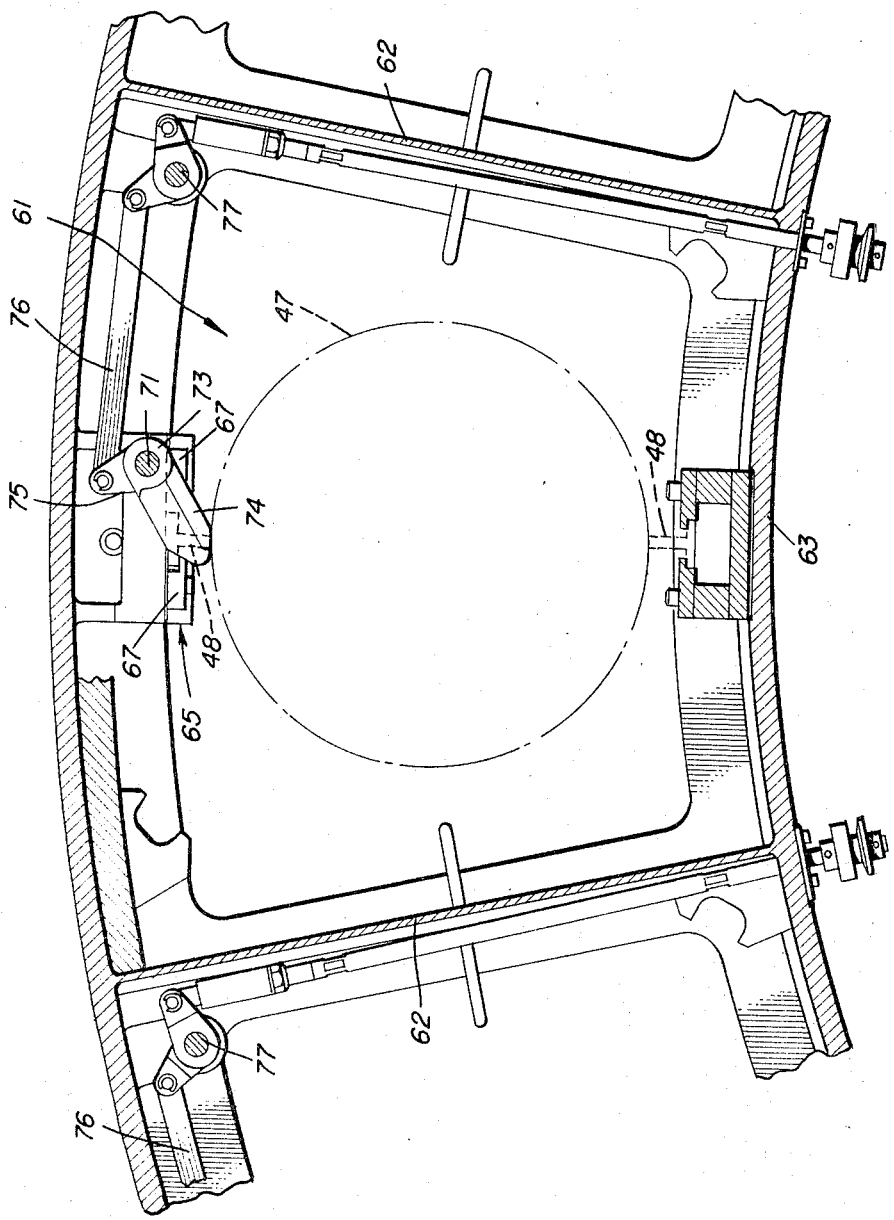
Figure 6:
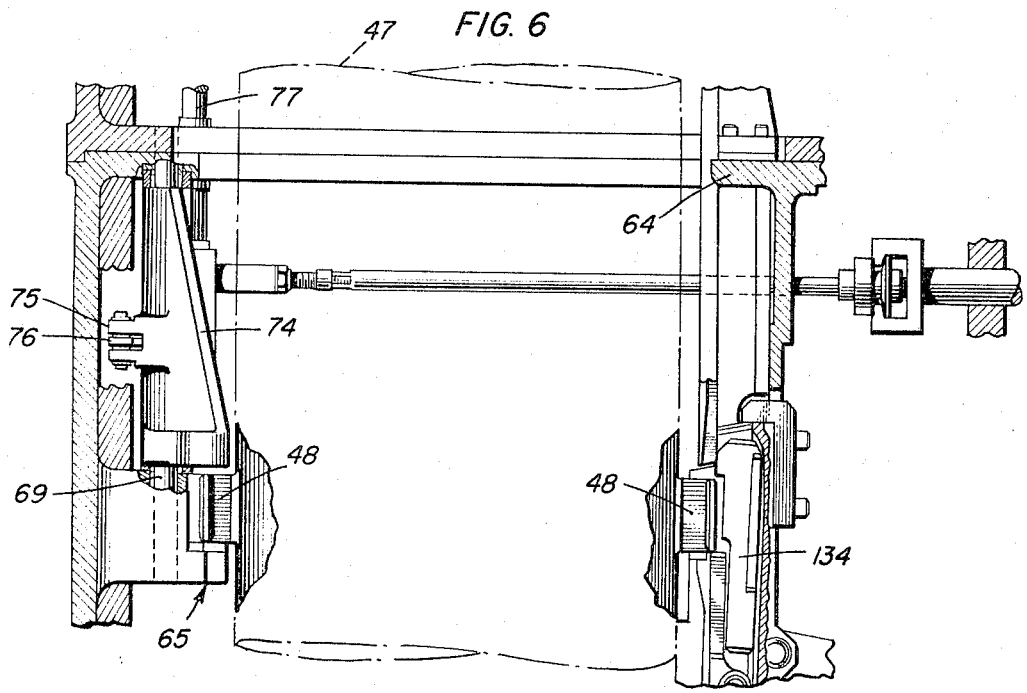
Figure 7:
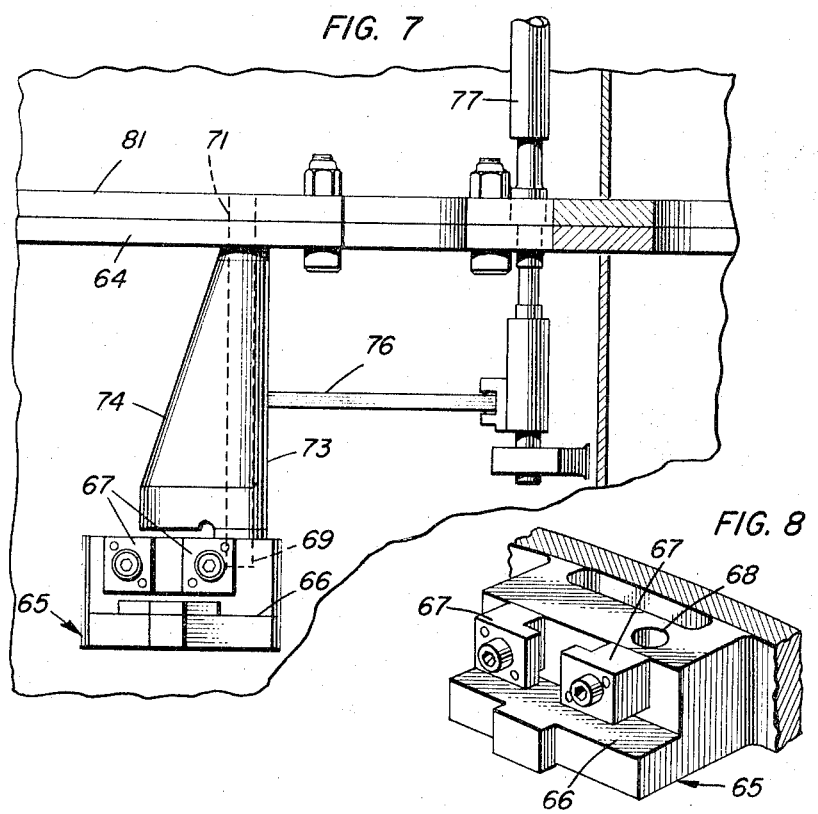
Figure 8:
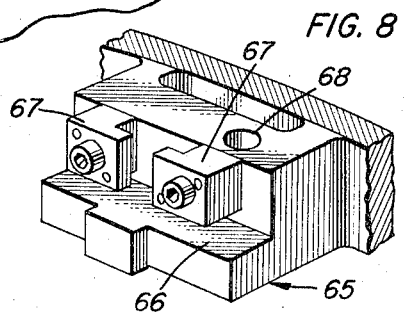
Figure 9:
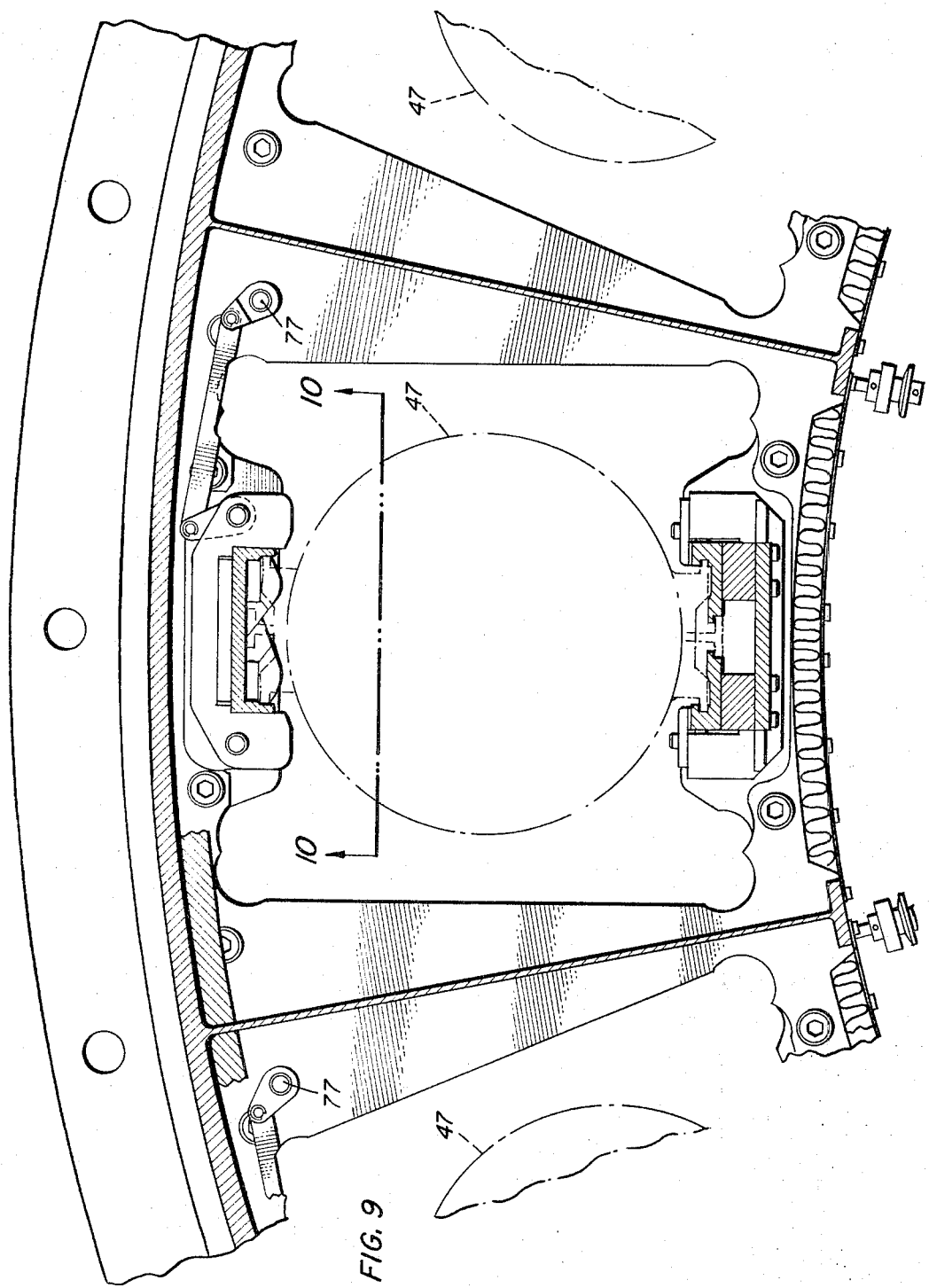
Figure 10:
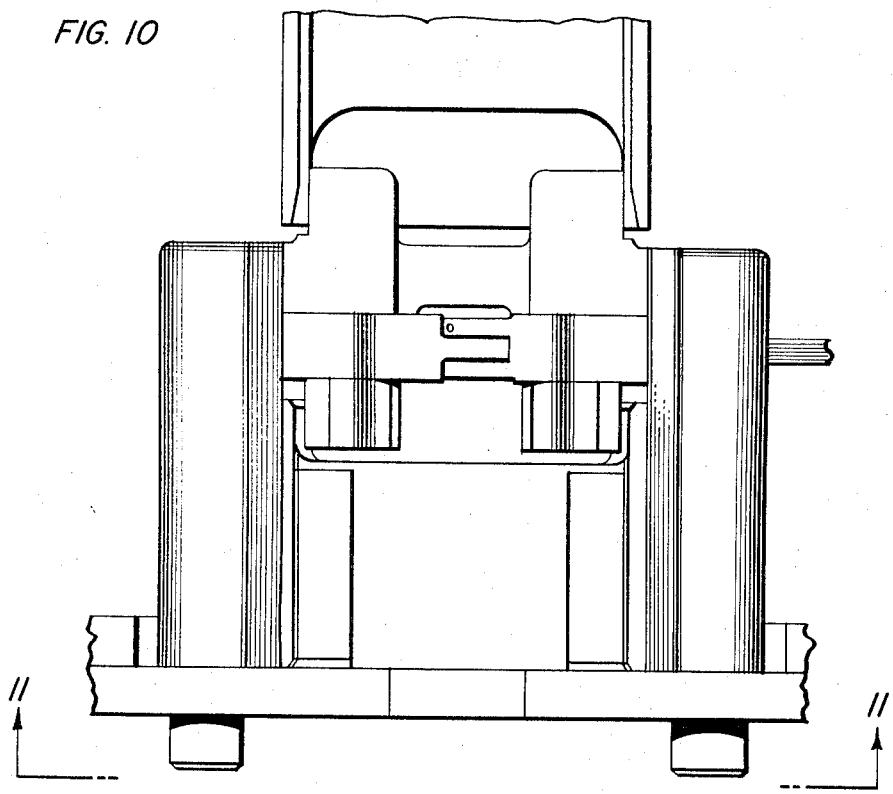
Figure 11:
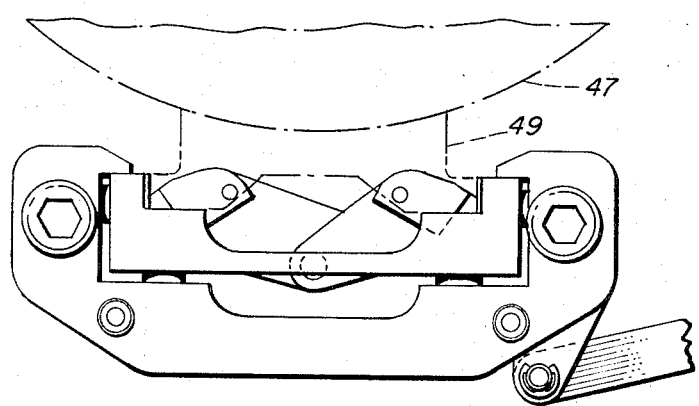
Figure 12:
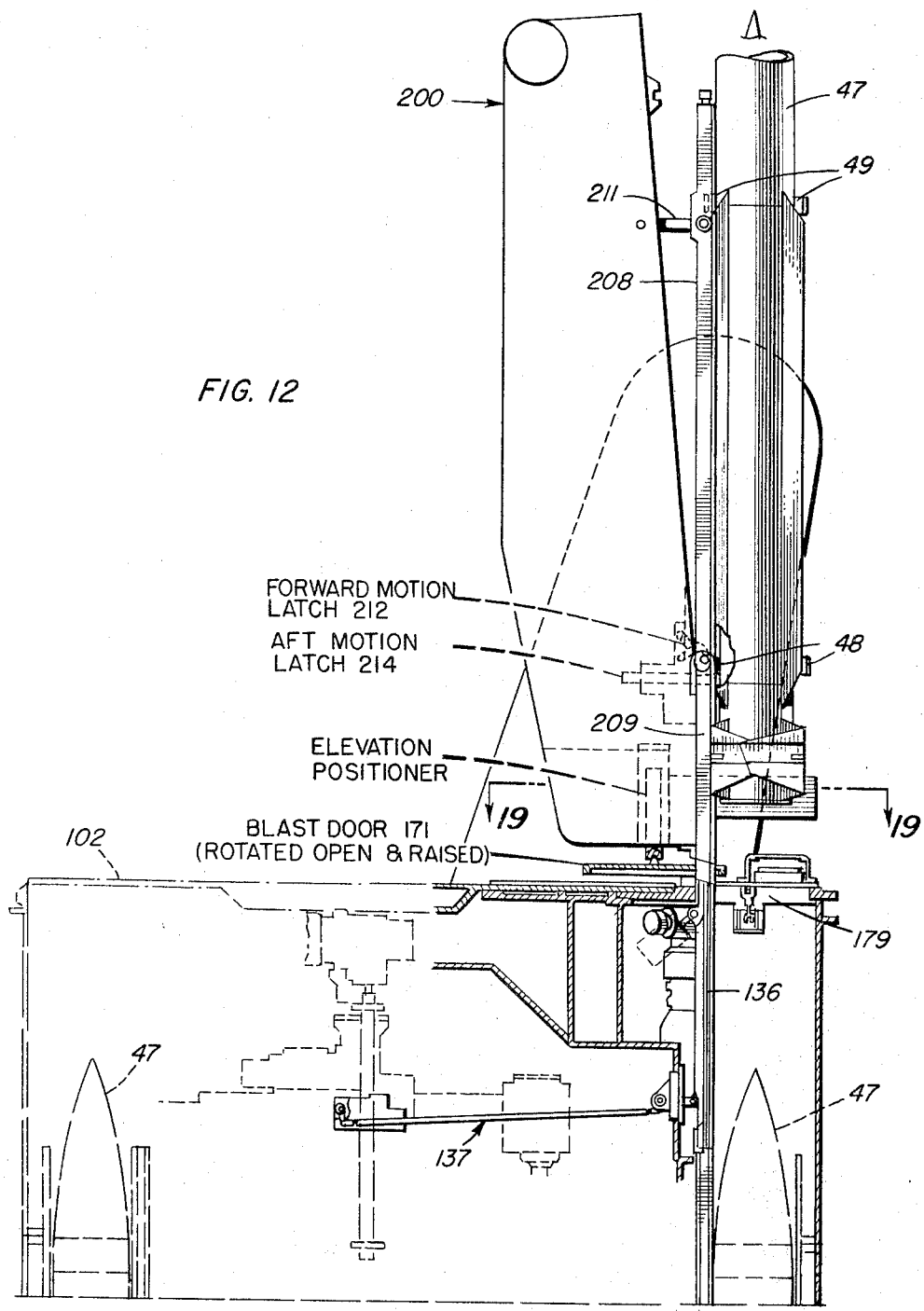
Figure 13:
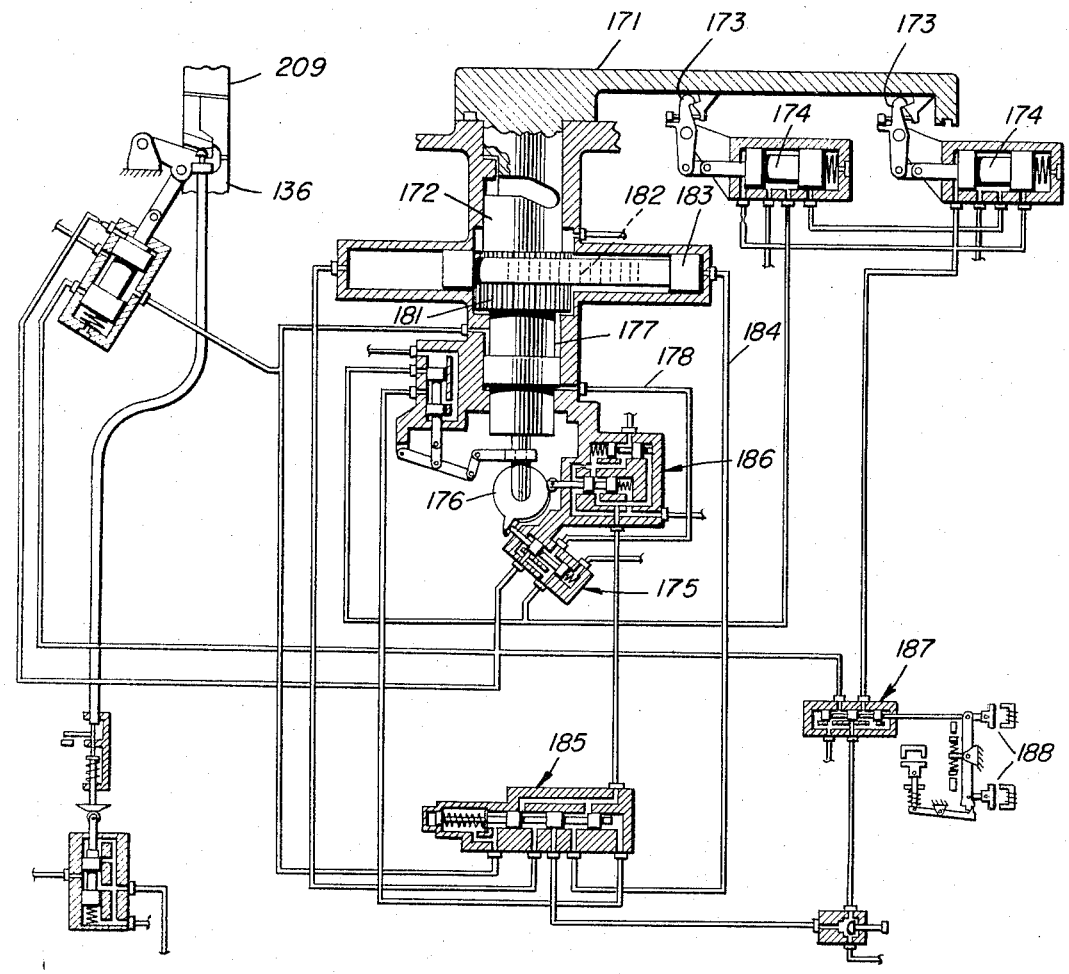
Figure 14:
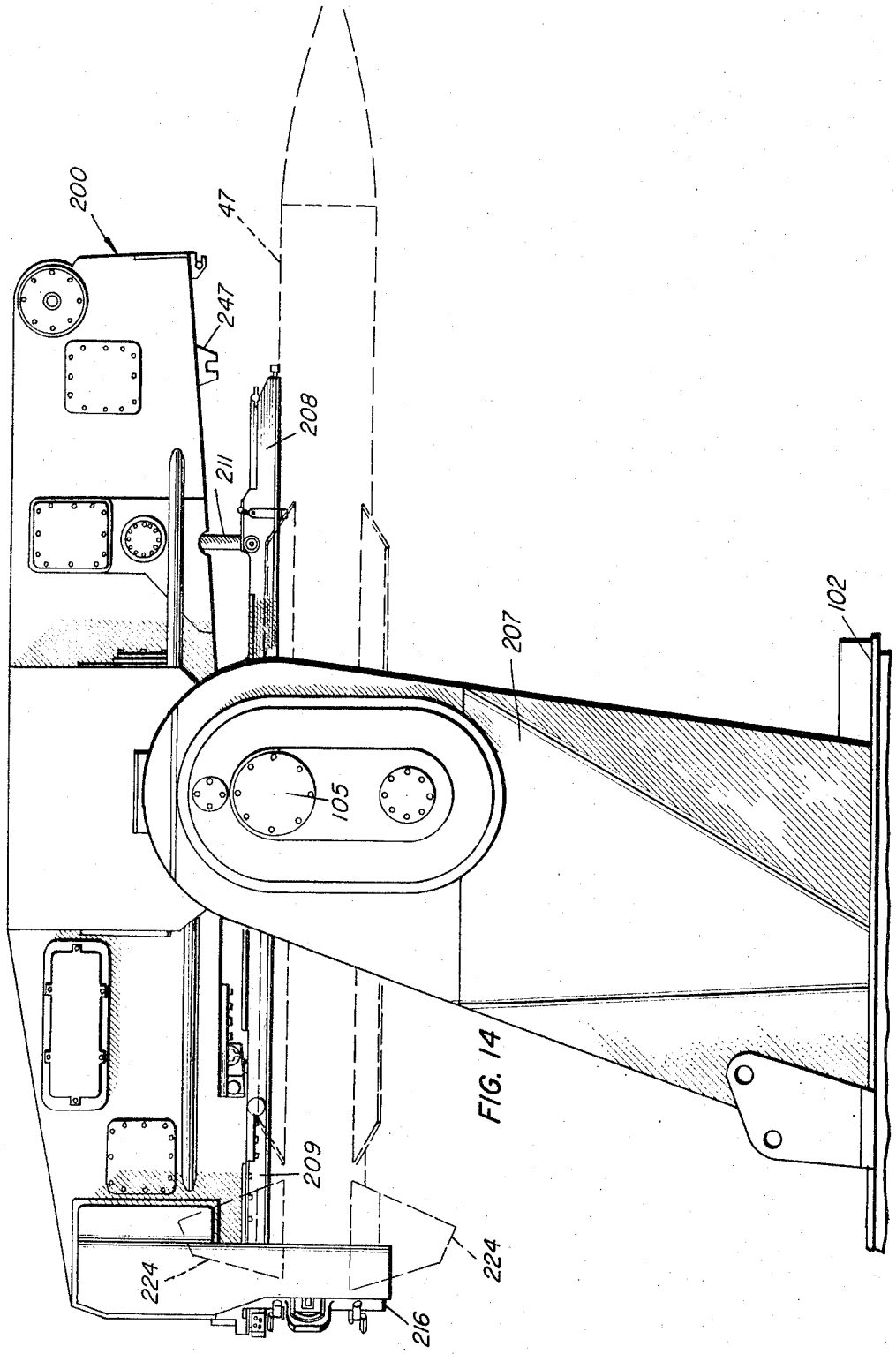
Figure 15:
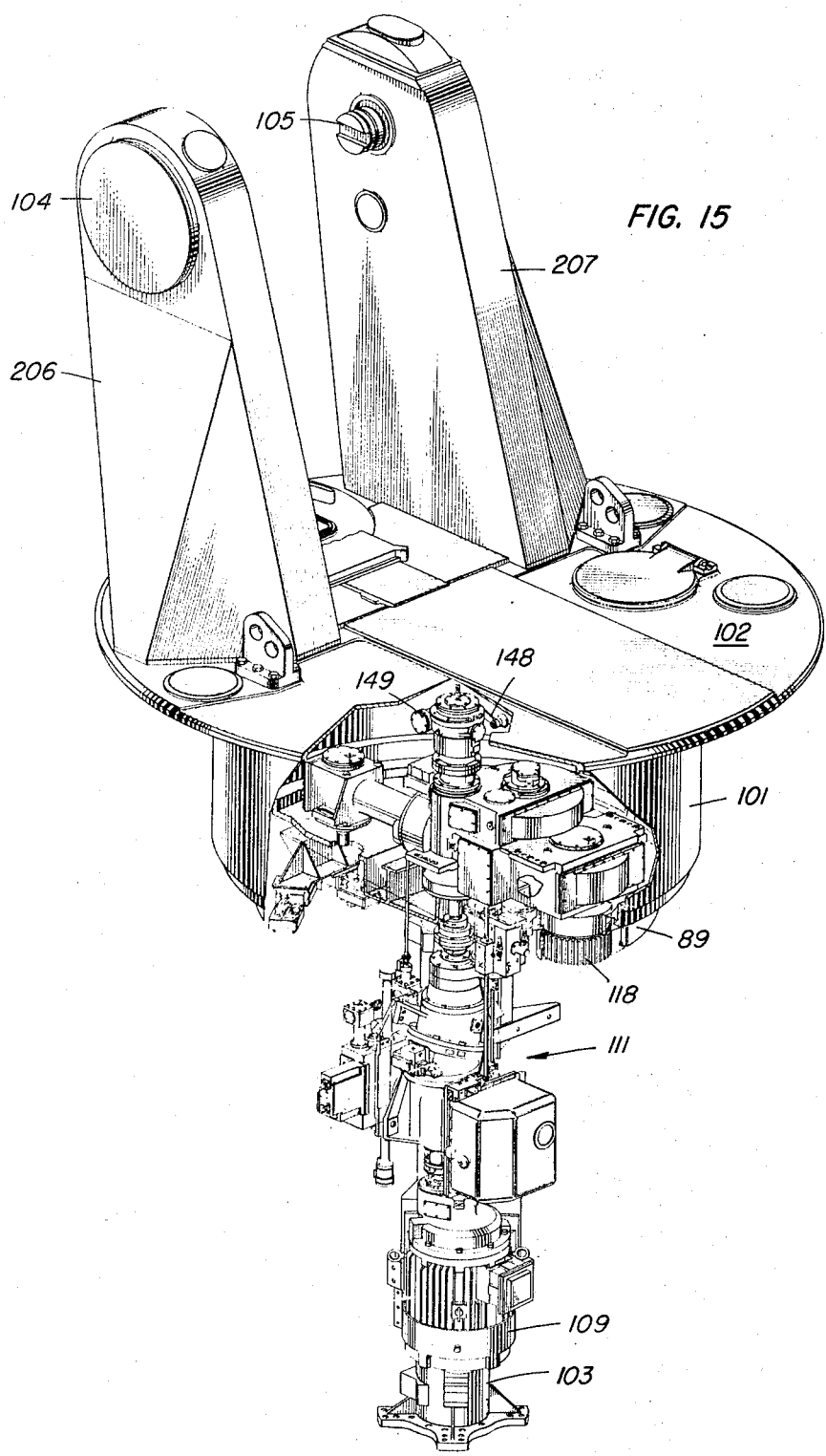
Figure 18A:
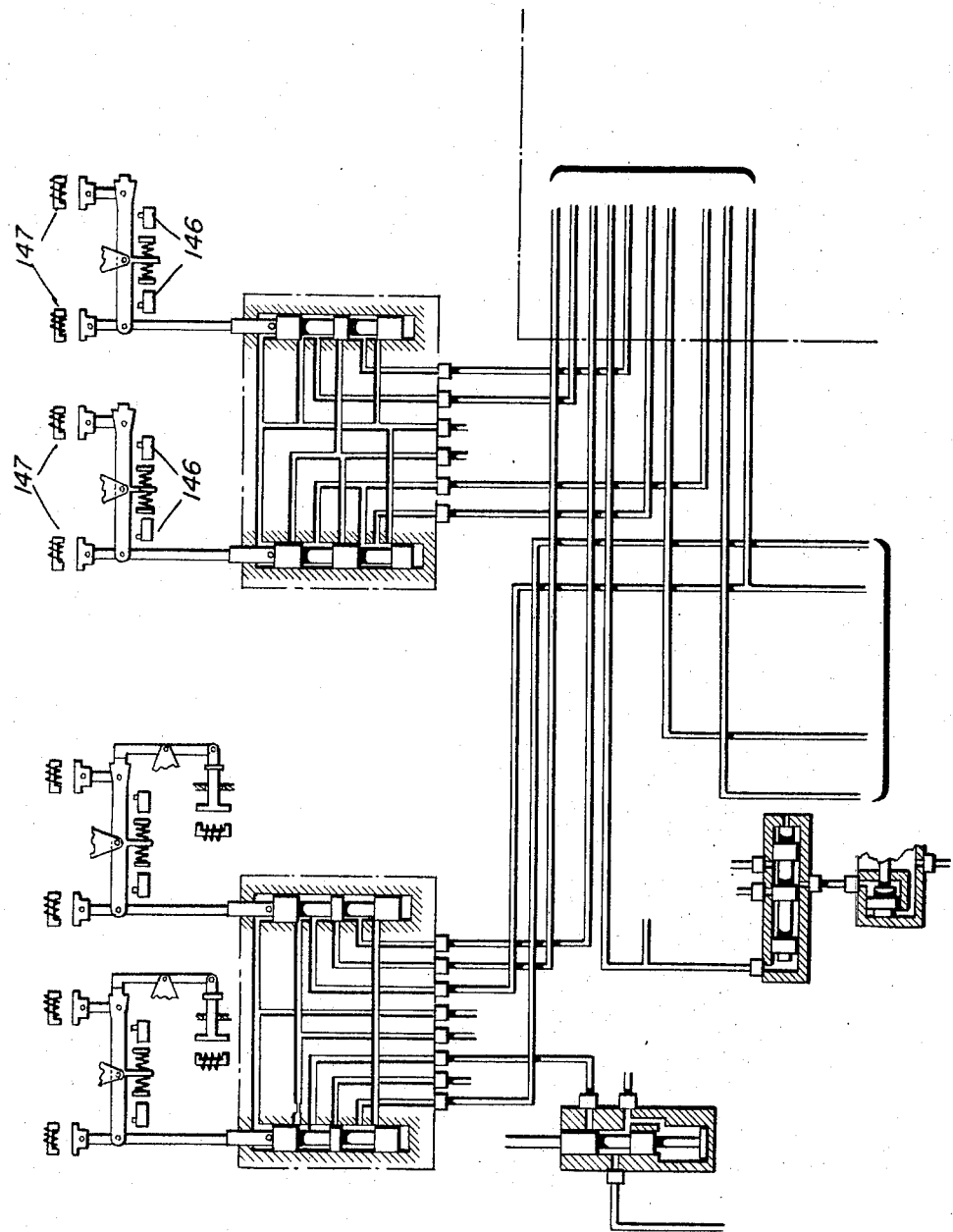
Figure 18C:
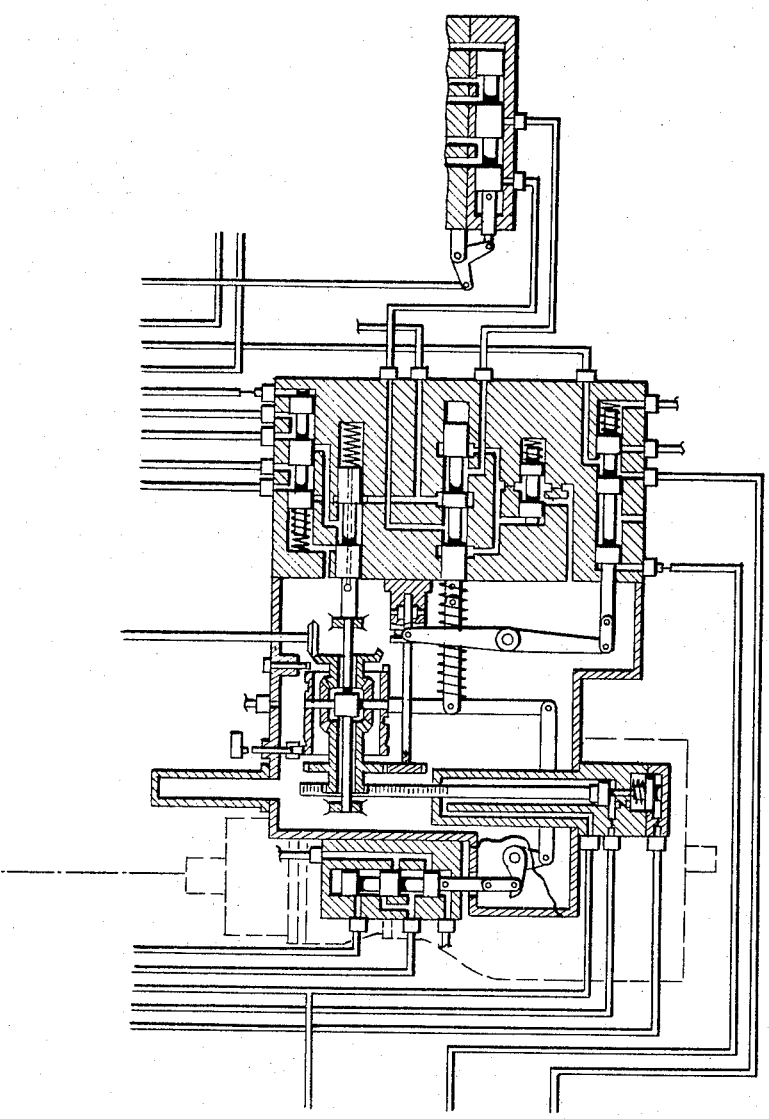
Figure 18D:
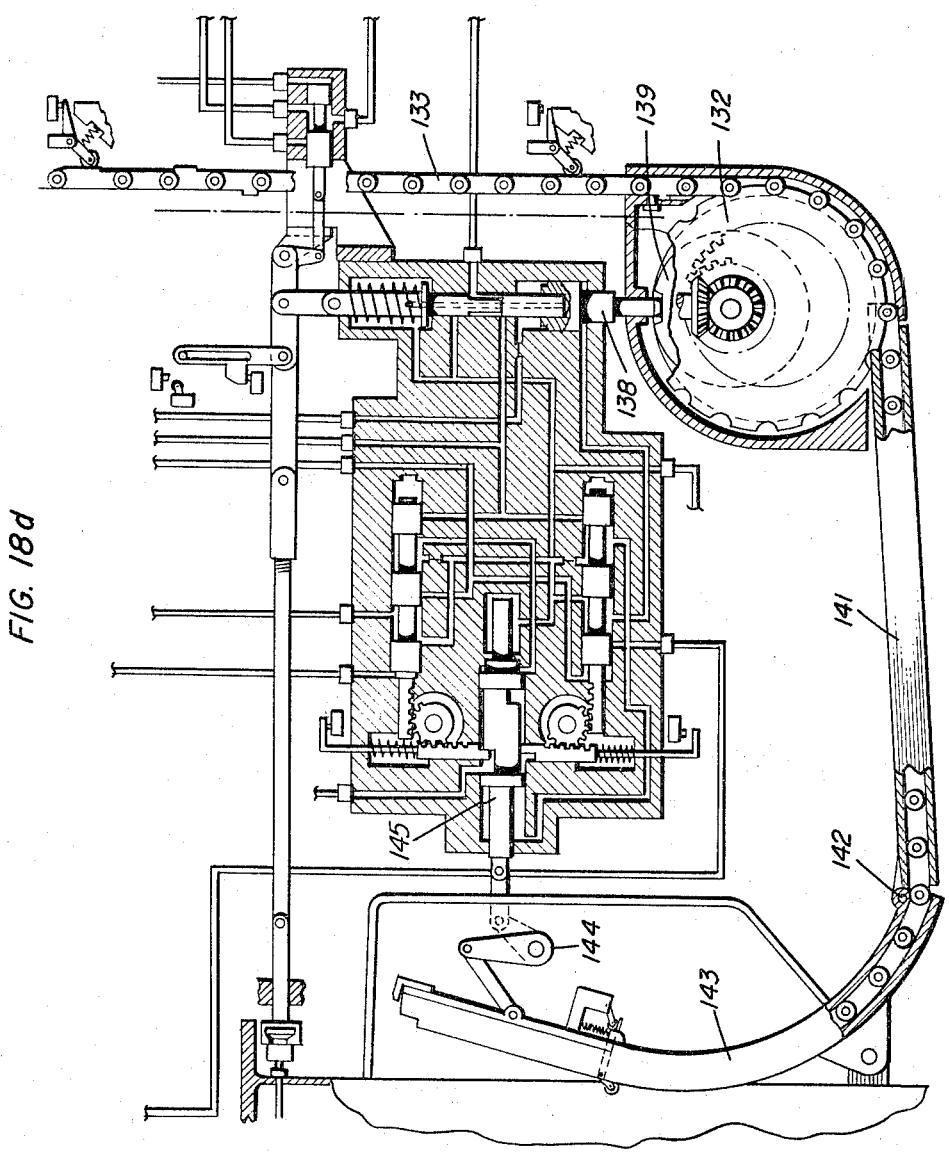
Figure 20:
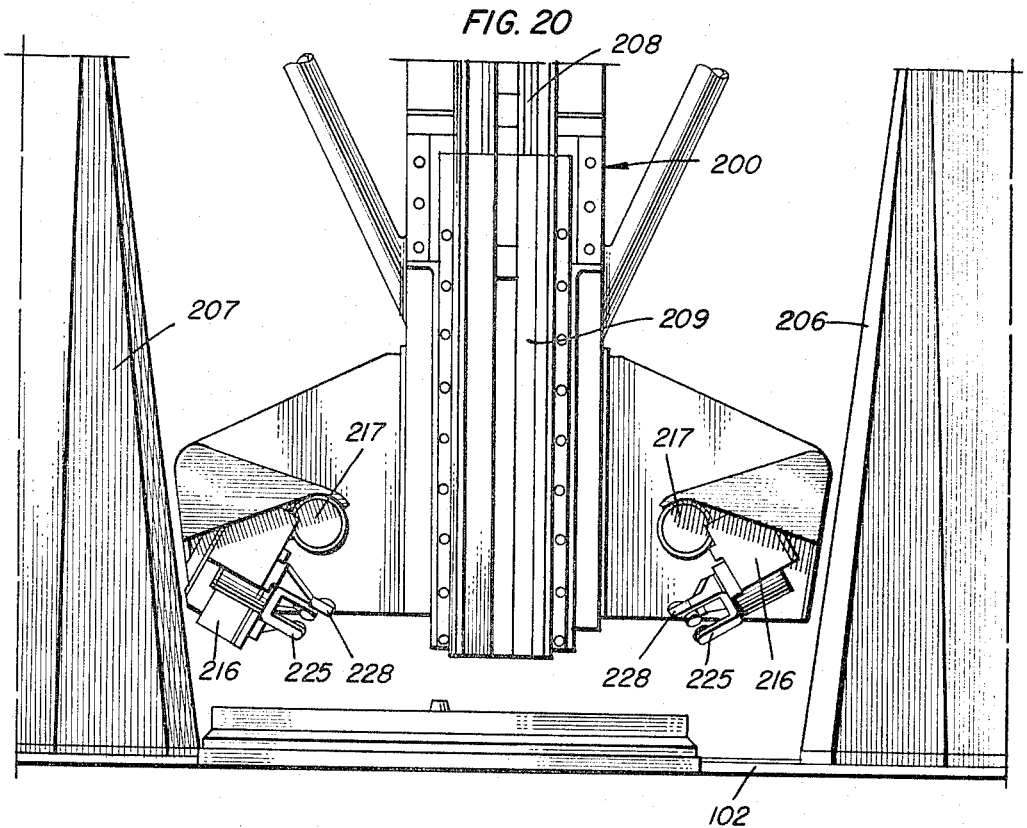
Figure 21:
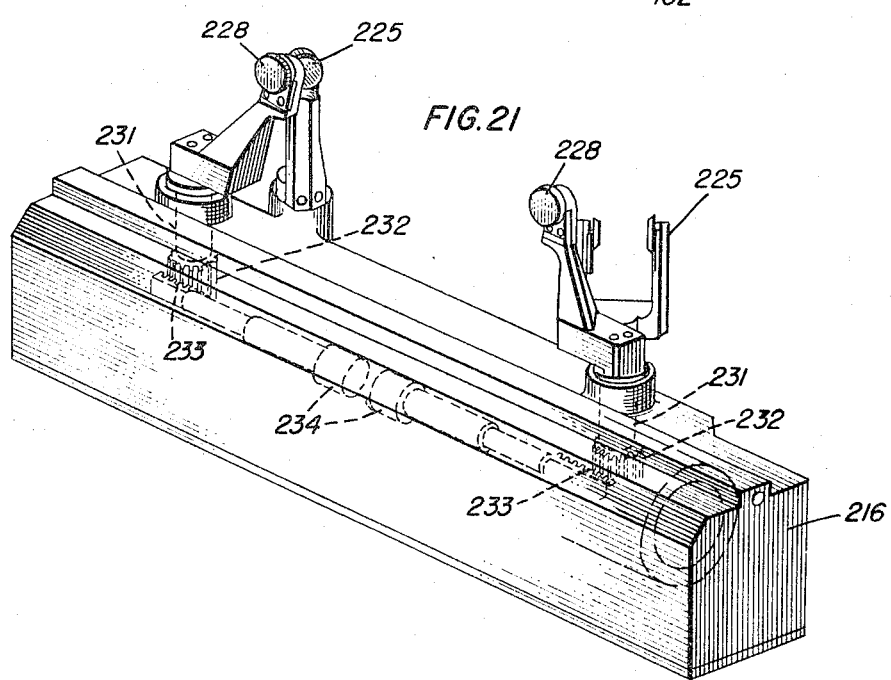
Figure 22:
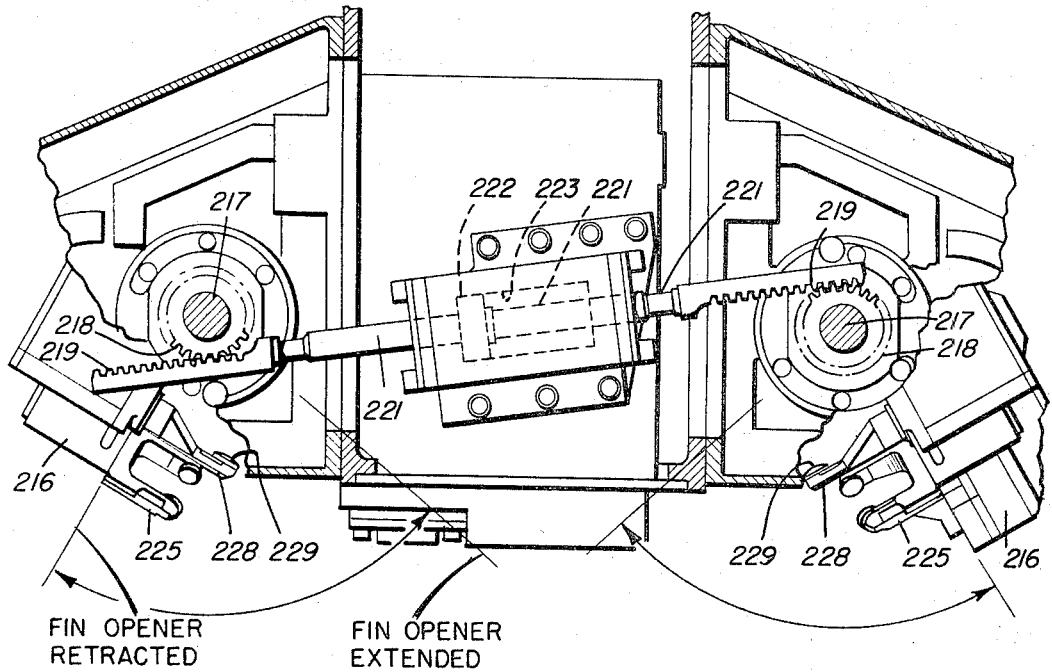
Figure 23A:
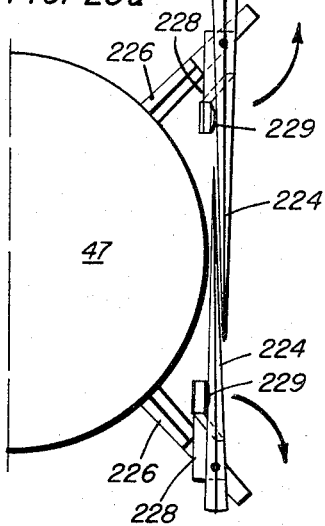
Figure 23B:
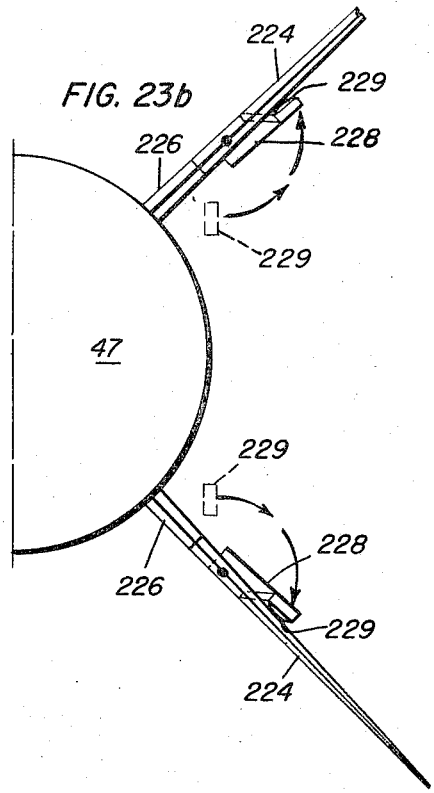
Figure 24:
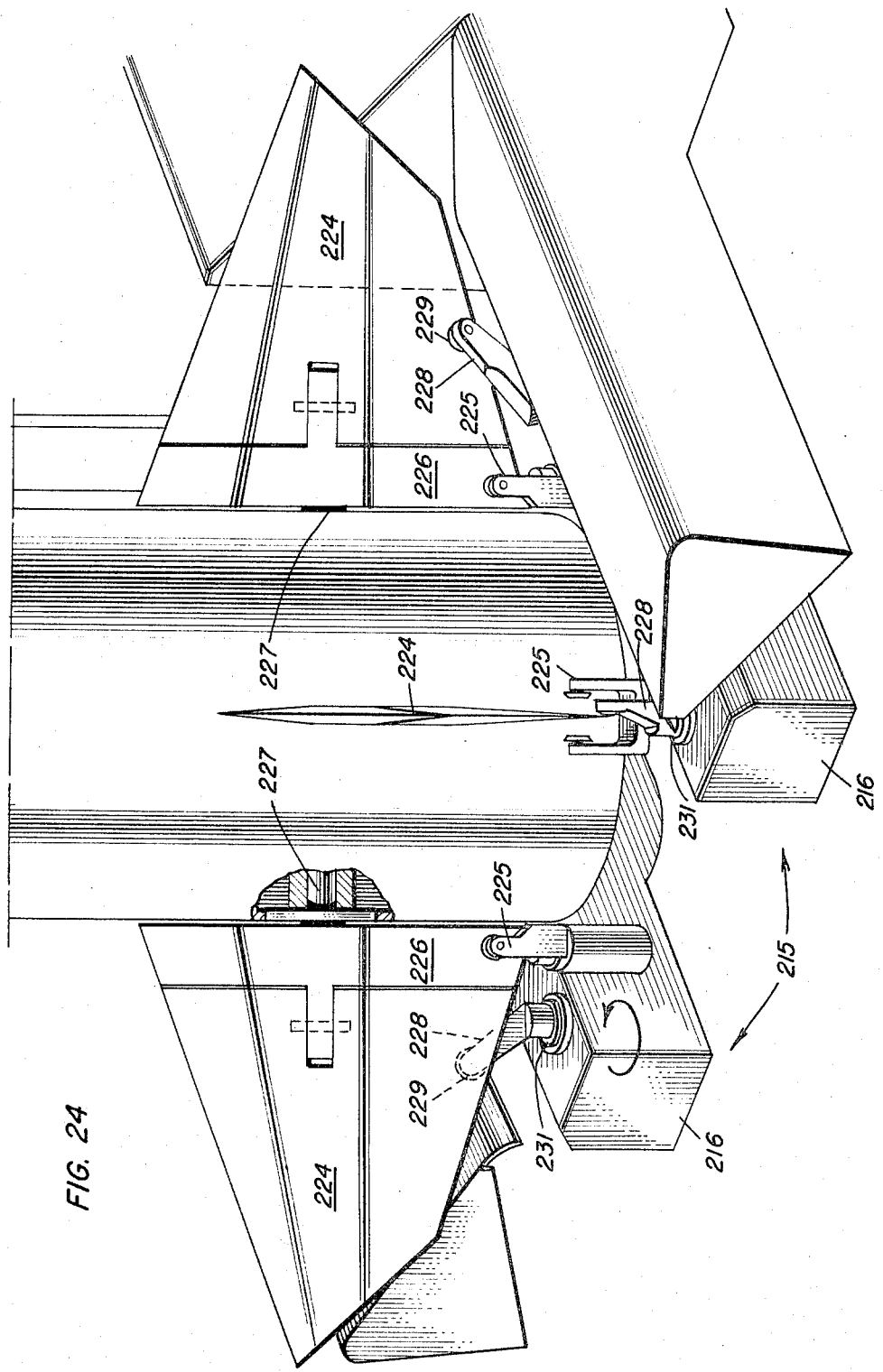
Figure 33:
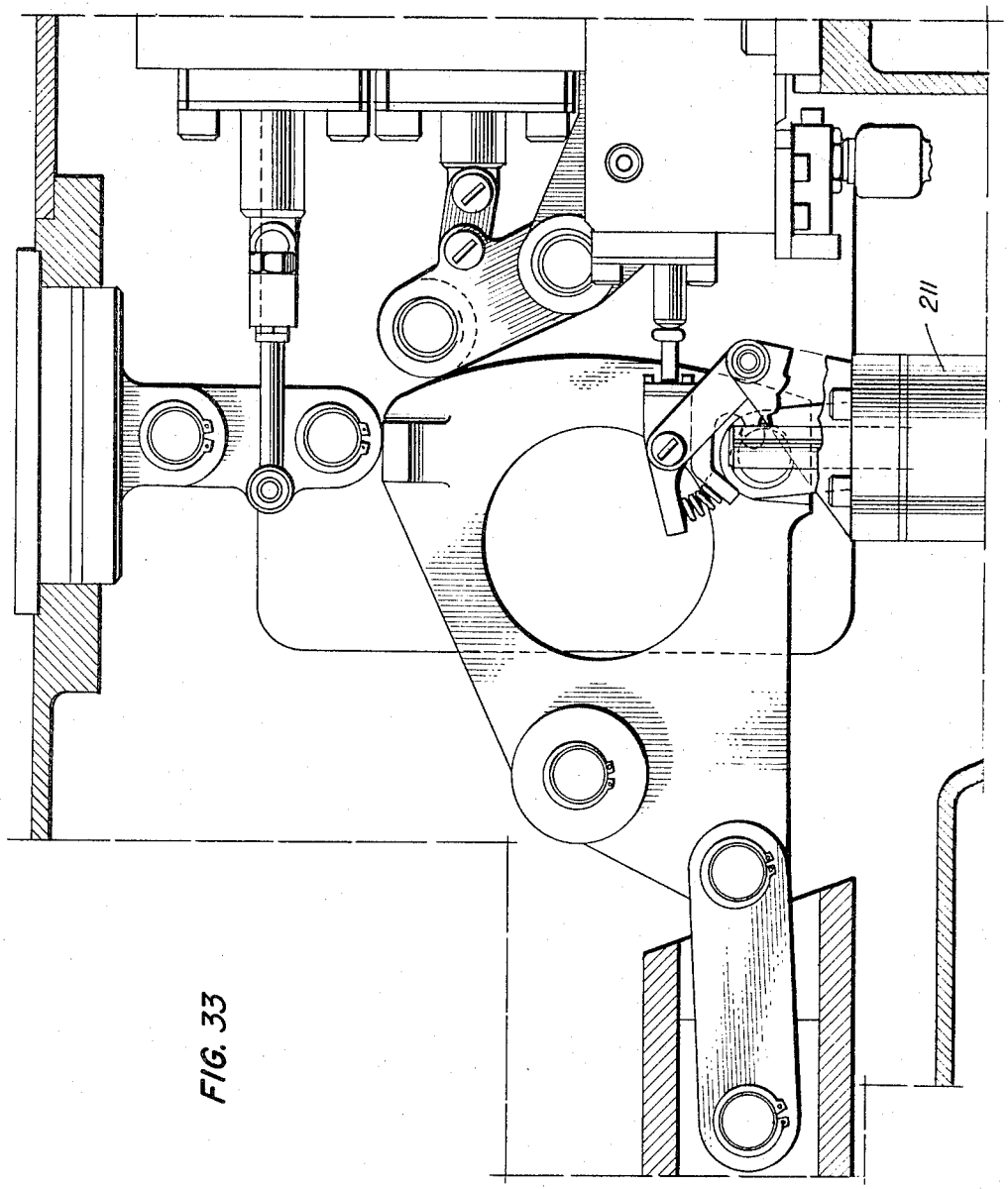
Figure 34:
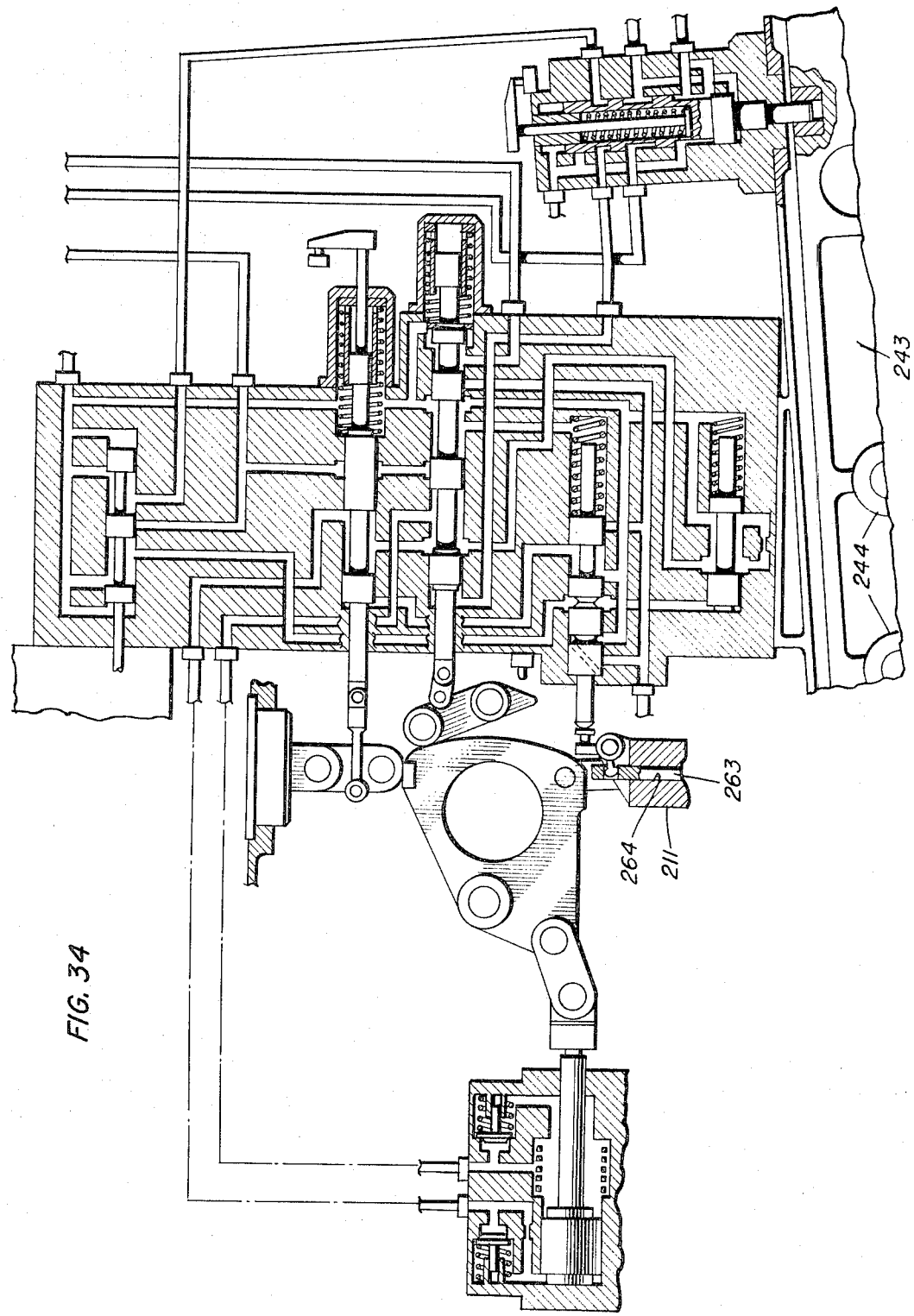
Figure 35:
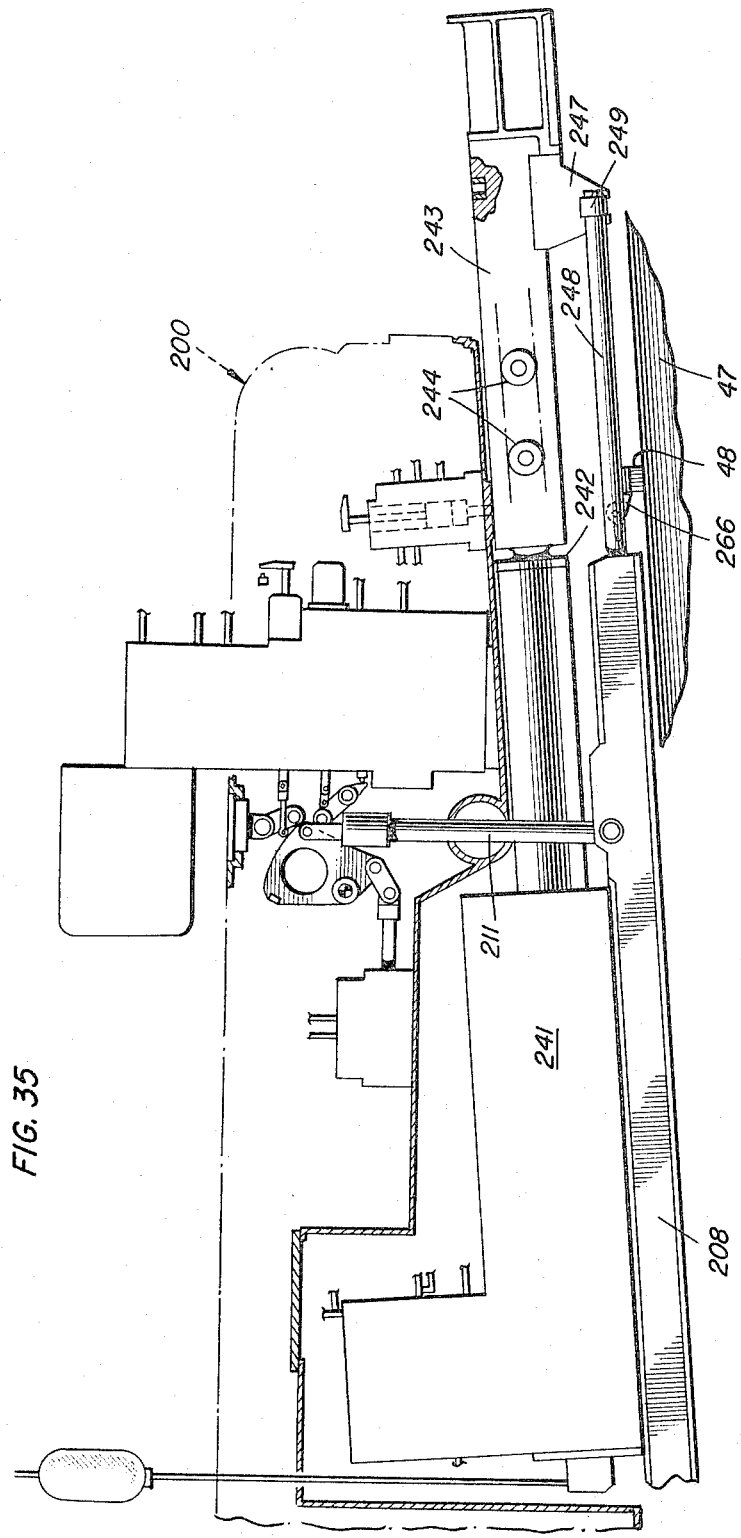

FIGS. 2a and 2b, when assembled, shows a perspective view of the launcher with the front and top of the magazine cut away to show the magazine structure and the housed interior rotative structure;

FIG. 3 is an elevation view of a launcher and magazine with the magazine shown in vertical section and a portion of the launcher arm support broken away;

FIG. 4 is a fragmentary perspective view of the magazine with the rotative structure removed;

FIG. 5 is a fragmentary view in horizontal section taken through one of the missile cells;

FIG. 6 is a fragmentary view in vertical section taken through one of the missile cells at the lower level thereof and showing the missile locking mechanism incorporated therein;

FIG. 7 is an elevation view showing details of the locking mechanism illustrated in FIG. 6;

FIG. 8 is a perspective view of the missile supporting rest which is carried in each of the cells;

FIG. 9 is a horizontal cross-sectional view through one of the missile cells showing the missile guiding rails and the forward shoe locking mechanism incorporated in each of the cells;

FIG. 10 is an elevation view looking at the upper missile latch from the line 10—10 of FIG. 9;

FIG. 11 is a fragmentary plan view taken along the line 11—11 of FIG. 10;

FIG. 12 is a fragmentary elevation view with portions shown in phantom outline and vertical section, the latter portions being taken through a portion of the magazine and showing the relative positions of the blast door and the missile launcher guide arm;

FIG. 13 is a diagrammatic view of the blast door and its operating mechanism;

FIG. 14 is an elevation view of the missile launcher trunnion support and launcher guide arm, the arm being disposed in a horizontal position with a missile loaded thereon;

FIG. 15 is a perspective view of certain parts of the rotative structure, namely, the top cover, the base ring, the center post attached to the base ring and the train/hoist mechanism carried by the center post;

FIG. 16 is a perspective view similar to FIG. 15 showing the elevating mechanism attached to the center post;

FIG. 17 is a perspective view of the train/hoist mechanism with portions thereof shown in phantom outline;

FIGS. 18a, 18b, 18c and 18d, when assembled, illustrate a schematic view of the hydraulic control of the hoist and train mechanisms;

FIG. 19 is a fragmentary view taken along a plane transverse to the guide arm and showing the positional relationship existing between the fin opening mechanism and the guide arm;

FIG. 20 is an elevation view showing the fin opening device in further detail;

FIG. 21 is an isometric view showing details of the crank arms of the fin opening device;

FIG. 22 is an elevation view showing details of the fin opening device as taken on line 22—22 of FIG. 19;

FIGS. 23a and 23b are plan views taken along a plane transverse to the longitudinal axis of a missile showing the fins of a missile in folded and opened positions, respectively;

FIG. 24 is a fragmentary perspective view of the tail portion of a missile with the fins shown in opened position;

FIG. 25 is a perspective view of the dud missile jettisoning mechanism incorporated in the launcher system;

FIG. 26 is a side elevational schematic view of the launcher guide arm with the missile retractable rail in the extended or lowered position;

FIG. 27 is an enlarged fragmentary view of an end portion of the retractable rail illustrating the rail retract trigger prior to actuation by the missile forward lug;

FIG. 28 is a transverse sectional view of the guide arm illustrating the jettison beam within the guide arm, the beam rollers and associated guide tracks;

FIG. 29 is a view similar to FIG. 26 and illustrates the missile and its forward shoe clearing the end of the retractable rail;

FIG. 30 is a view similar to FIG. 29 illustrating the rail in a fully retracted position;

FIG. 31 is an enlarged fragmentary sectional view of a portion of the guide rail illustrating the retracted jettison pawl and associated mechanism;

FIG. 32 is a functional mechanical-hydraulic schematic of the jettison pawl, beam latch and associated structures;

FIG. 33 is an enlarged fragmental view of the rail crank and its operating links and latches;

FIG. 34 is a functional mechanical-hydraulic schematic of the rail retract and locking mechanisms;

FIG. 35 is a view similar to FIGS. 26, 29 and 30 and illustrates the jettison beam fully extended in its outermost position; and FIG. 36 is an enlarged longitudinal sectional view of the jettison piston and its associated mechanical-hydraulic elements.

Referring to the drawings wherein like parts are designated by like numerals and referring particularly to FIGS. 2a and 2b, the magazine 41 is made up of a plurality of cylindrical sections. Starting with the magazine base 42, a bottom section 43 is mounted thereon, a lower center section 44, an upper section 45 and a top section or stand 46 form the outer shell of the magazine. This shell is formed of armor steel, three-fourth inch ballistic material, and is self-supporting.

The base 42 is supported on a plurality of feet 51 and has a bottom plate 52 in which an air duct 53 and an opening 54 giving access to the interior of the magazine are located. The outer rim section of the base form a circular plenum chamber 55 and provides a housing for injection nozzles 56, as well as a passageway for hot exhaust gases should one of the missiles 47 become ignited inadvertently. Electrical connectors 58 at the bottom of slip ring 103 provide means for making electrical connections from off mount. Ports 57 provide access to the magazine 47 through this portion of the base 42. The bottom plate 52 is water tight so that connections must be made through the plate 52 to provide an outlet for such water as might be brought in through the injection nozzles 56 to quench an inadvertently ignited missile.

A ring-shaped cover plate 58' covers the plenum chamber 55 and is itself formed with openings for the nozzles 56 to project through. Over each of the nozzle openings an upstanding collar 59 shields the nozzles 56 and provides a housing for an electrical connection 60 to which the warm-up electrical circuit of the missile is connected.

The water injection system which is housed in the magazine base 42 is a safety factor and provides a plurality of injection nozzles 56 connected to a source, not shown, of both fresh water and salt water to inject water into any of the cells 61 should one of the missiles become inadvertently ignited while in the cell. At the bottom of each of the cells a blow-out plate provides a passageway to the plenum chamber. Also located in each of the cells is an injection nozzle mounted on a standpipe which is part of the water system.

The bottom section 43 forms the base of the individual cells 61 in which the missiles 47 are stored in a vertical position. Each cell is centrally positioned over one of the collars 59 and extends upward to the top of the magazine, being formed in its entirety by the bottom section, the lower and upper center sections and the stand. The cells 61 are separated from one another by radial partition walls 62 and have an inner circular wall 63 which in the bottom section is formed with openings to permit the hoisting means to engage the shoe of the missile to hoist the missile from the magazine. Located adjacent the top plate 64 of the magazine base 42, a rest 65 supports the aft shoe of the missile, and serves as a pivotal support for the lower hold-down latch 70 which engages the aft shoe and prevents the missile from moving upward in the cell in the event the missile is inadvertently ignited. The rest 65 (FIGS. 7, 8 and 9) has a base portion 66, aft shoe engaging lugs 67 and is bored at 68 to receive the pivot pin 69 of the lower hold-down latch 70. The pivot pin is journaled in the bore 68 and in a hole 71 in the top 64 of the bottom section and the bottom plate 81 of the lower center section. The latch 70 has a cylindrical section 73 and an extending fin 74. An offset yoke 75 is connected to an operating lever 76 which pivots the latch 70 about its pivot to swing the extending fin 74 into engagement with the aft shoe 48 of the missile 47 and retain it in engagement with the rest 65. The horizontal operating lever 76 is connected in turn to a vertical rod 77 which extends the length of the cell 61 and is connected to and operates the forward shoe latching means.

The lower center section 44 is essentially a cylindrical shell which provides a necessary length to accommodate the missile.

The upper center section 45 differs in construction from section 44 in that it is shorter in height and is formed with a rim 80. The inner circular wall 83 is formed with a top rim 82 which supports the train circle bearing race 85 and the ring gear 86. The bearing race 85 carries the bearing 99 which carries the ring base 101 of the top cover plate 102. From the ring base 101, a center post 103 depends into the magazine 41 and supports a number of operating mechanisms which rotate with the rotating structure. The upper section or stand 46 of the magazine 41 carries on its inner circular wall 83 the bearing 99 which supports the entire rotating structure. A plurality of angled radial braces 87 extend from the inner wall 83 at the point of bearing support to the wall of the top section 46 and provide for rigidity in the magazine 41. The bearing is a four point contact ball-bearing with radial and thrust capacity to take care of the heavy lateral and vertical shock loads.

The rotating structure

The rotating structure (FIGS. 15 and 16) of this particular missile launching system consists of the bearing support for the top cover plate, the ring base and the components supported thereby. The top cover plate 102 and the ring base 101 are welded together to form a unit. The top cover plate supports the trunnions 104 and 105 which in turn support the launcher guide arm 200. The ring base 101 has a center post 103 attached to its underside. This center post 103 extends downward into the magazine and carries all of the rotating structures such as the hoisting/training mechanism, the elevating mechanism, as well as screens and platforms which are necessary and rotate with the rotating structure. This center post 103 is the longitudinal axis of the magazine and at its lower end carries a slip ring 107 through which all electrical connections are made to outside sources of current. It also includes connections, not shown, for the anti-icing fluid which is connected to a heat exchanger located outside of the missile structure.

The train/hoist mechanism

The train/hoist mechanism 110, FIG. 15, is attached to the center post 103 and rotates therewith. It is the mechanism which is used to hoist the missiles 47 from the magazine 41 onto the launcher arm guide 200 and when not being used for hoisting may be used to train the launcher guide arm 200 which is done by rotating the ring base 101 and the top cover 102 on the bearing 99. The mechanism comprises a motor 109 (FIGS. 2a, 2b, 15 and 17) connected through a series of shafts and gears 111 to a transmission 112. The transmission 112 provides a movable sleeve 113 which may be connected to a bevel gear 114 through gear 115 or to a pinion 116 through gear 117. The bevel gear 114 drives the hoisting mechanism 110 while the pinion 116 drives the gear 118 through a train of gears 119. The gear 118 meshes with the ring gear 86 and turns the top cover 102 to train the missile 41.

The hoisting mechanism (FIG. 18b) is actuated through the movement of the sleeve 113 which in turn is moved from train drive hoist through the lever 122. The lever 122 is moved through a rod 123 connected to a hydraulic valve 124. A companion rod 125 is moved with the rod 123 moves into engagement with a gear 126 on the gear train 119 to lock the gear train 119 and to prevent any movement of the train mechanism when the hoist drive is connected. The bevel gear 114 (FIG. 17) drives a pinion 128 through mechanism 129. This pinion is in mesh with a ring gear 131 which is integral with sprocket 132. The sprocket 132 drives the hoist chain 133. Connected to the operating end of the chain 133 (FIG. 17) a hoist pawl 134 is adapted to engage the aft shoe 48 of the missile 47 to hoist the missile from the magazine 41 onto the launcher arm guide 200. A housing 135 attached to sprocket housing 130 receives the hoisting chain 133 when it is withdrawn, preventing any entanglement of the chain 133 with the rotating parts of the launching system.

The operation of the hoisting chain is shown diagrammatically in FIGS. 18a, 18b, 18c and 18d and these drawings constitute a single drawing by arranging 18a in the upper left corner, 18b in the upper right corner, 18c in the lower right corner and 18d in the lower left corner. Operation of the hoisting mechanism is specifically pointed out in these drawings but will not be described in detail. There are many safety operations and tell-tale signals also connected with the hoisting mechanism, for example, the connection to the rail 136 which is shown diagrammatically connected to the lever 122 through the rod and lever mechanism 137. This will insure the retraction of the rail 136 when the sleeve 113 is shifted to train engaging position. Also, an extension of the hydraulic valve 138 moves into engagement with a cam 139 connected to the sprocket 132 to prevent movement of the sprocket when the mechanism is in train engaging position. The housing 141 through which the chain moves from the sprocket to engagement with the shoe of the missile is hinged at 142 to permit the section 143 of the housing to be folded through the lever system 144 connected to the hydraulic operator 145. This mechanism withdraws the hoisting pawl and the end of the chain out of any cell and into the central rotating part of the system. This is done during the training exercise after the missile has been hoisted to the guide arm and the chain retracted. Micro switches connected to the hydraulic valves or to parts operated by the hydraulic valves indicated at remote locations the position of the missile and operate stops to prevent the operation of the mechanism when unsafe. Switches 146 operated by solenoids 147 serve to initiate the control valves for the hoist/train mechanism. A hand crank 148 (FIG. 15) is connected to the hoist/train mechanism through a worm gear 149 to permit manual operation.

The elevating mechanism

The elevating mechanism is used to elevate the launcher guide arm in the firing of the missile. It consists mainly of an electric motor 151 securely attached to the center post and rotating with the post. The motor acting through a coupling, drives a hydraulic transmission which through mechanisms comprising gears, shafts and an elevation drive gear train rotates a gear 152. This gear is mounted on the shaft 153 on which the launcher arm guide 200 is mounted. The elevating mechanism 150 is used in the firing of the missile 47 and in the loading of the missiles into the magazine 41, the missiles being loaded onto the arm 200 while the arm 200 is in horizontal position and the arm 200 is then elevated to vertical position and the missiles delivered to the magazine 41 by the hoisting mechanism 110. A hand crank 154 is connected to the drive train through a worm gear 155 to permit the mechanism to be hand operated.

The blast door

The blast door 171 (FIGS. 12 and 13) covers the opening in the cover plate 102 and is opened to permit the missiles to pass through from the guide arm 200 when the magazine 41 is being loaded and to pass onto the guide arm 200 from the magazine 41 when the missile is being launched. The door 171 (FIG. 13) is mounted on a piston 172 which has both vertical and angular movement. The operation of the door 171 is tied in with the delivery of the missile to the guide arm 200 and also with certain safety devices, not shown. Catches 173 controlled by hydraulic valves 174 release the door 171 for opening. Hydraulic fluid controlled by the hydraulic valve 175 which is operated by the cam 176 enters the cylinder 177 by means of the pipe line 178. This fluid raises the piston 172 to lift the door 171 free of obstructions. This lifting movement is very slight and is followed by a rotative movement of the piston 172 turning the door 171 about the piston 172, as a pivot, and clearing the opening 179 for passage of the missile. The rotation of the piston 172 is accomplished through the gear 181 and the rack 182. The rack 182 is carried by the piston 183 and is operated through the hydraulic fluid in the pipe line 184 which is controlled by valves 185 and 186. Valve 186 is operated by the rotating cam 176 and the opening sequence is operated in reverse to close the door 171. Connected in the system are control units 187 which are initiated by solenoids 188.

The launcher guide arm

The launcher guide arm 200 is a housing for various mechanisms which are essential to the successful launching of the missile. It is in the form of a substantially rectangular weldment which is pivotally mounted on spud shafts 104 and 105 which are carried by the trunnion supports 206 and 207. The guide arm 200 receives the missile 47 from the magazine 41 by way of the blast door 171. It is received by the guide arm 200 on a retractable rail 208 which is pivoted adjacent the fixed rail attached to the guide arm 200 and is extended to form a continuous rail (FIG. 14).

The retractable rail

The retractable rail 208 (FIG. 12) is pivoted at the point where the fixed rail 209 stops. Located adjacent the support portion of the retractable rail 208 a pair of retract shafts 211 are pivotally attached to the retractable rail 208 to move the rail through a small arc from its extended position to its retracted position. The retractable rail 208 is in extended position for most of the time cycle, it being retracted during the interval when the missile leaves the rail to go into free flight and during jettisoning procedures. When the rocket motor of the missile is fired, the missile 47 travels along the retractable rail 208 until the forward shoe 49 reaches the end of the rail 208. At this point the aft shoe 48 reaches a point where the flanges on the rail terminate. The forward shoe 49 contacts a rail retract trigger and through a hydraulic mechanism the rail is retracted so that the aft shoe and the fins clear the rail.

The forward motion latch mechanism

The forward motion latch mechanism 212 (FIG. 12) is shown in detail in patent application Ser. No. 306,664, filed Sept. 4, 1963, now Patent No. 3,166,981, and comprises a latch in the path of movement of the aft shoe of the missile. Contact with the forward motion latch stops the missile on the rail 208 and holds the missile in latch contacting position until the missile is fired and the force of the missile motor is sufficient to overcome a spring holding the latch in position. With the overcoming of the action of this latch spring, a hydraulic mechanism moves the latch from the path of the missile shoe and the missile is released for flight.

The aft motion latch mechanism

The aft motion latch 214 fully disclosed in patent application Ser. No. 341,817, filed Jan. 31, 1964, now abandoned, cooperates with the forward motion latch 212 to hold the missile on the rail 208. When the aft missile shoe 48 contacts the forward motion latch 212 and stops, the aft motion latch 214 moves outward and slides just behind the aft shoe 48 of the missile to prevent the missile from slipping from the rail 208. This mechanism is a precision mechanism with the tolerances between the forward motion latch 212, the aft shoe 48 of the missile and the aft motion latch 214 being held to extremely close limits. Cooperating with the movement of the aft motion latch the hoist pawl 134 which is in engagement with the hoisting chain 133 and the aft shoe 48 is released and the hoist chain 133 returned to its housing 135. The aft motion latch 214 is normally in the path of movement of the missile on the rail and is retracted to allow the missile shoe 48 to pass and engage the forward motion latch 212. It is immediately extended to engage the back end of the aft shoe 48 of the missile and hold it on the rail 208.

The fin openers

The missile 47 has two pairs of folded fins which are used for guidance of the missile. These folded fins must be unfolded after they are on the guide arm and held on the retractable rail by the aft motion latch 214. Referring to FIGS. 14 and 19 through 24, the fin openers 215 (FIG. 19) are illustrated in pairs carried by a support 216 which is in turn mounted on a shaft 217. The shaft 217 is fitted with a pinion gear 218. This pinion is in mesh with a rack 219 (see FIG. 22 also) which is part of a rod 221. The center portion of the rod is formed with a piston-like enlargement 222, which is carried in cylinder 223 and reciprocal by means of fluid pressure on either side of the piston 222. The two pairs of fin openers are identical and the rod 221 is arranged so that the linear motion of the rod results in rotary motion of the shaft 217 to swing the supports 216 to a position under the folded fins 224.

The support 216 carries yoke members 225 which engage the inner portion 226 of the folded fins and hold the fin against rotation on its axis 227 (FIG. 24). After the engagement of the inner portion of the folded fin by the yoke 225, a crank arm 228 carried by the support 216 moves a pad 229 against the inner face of the folded portion of the fin and swings it to open position. The crank arm 228 is carried on the shaft 231. This shaft is mounted for partial rotation in the support 216 and is activated through a pinion 232 located on the end of the shaft 231 which is engaged by a rack 233. This rack is reciprocated by a piston 234 under the influence of fluid pressure. The fins are locked in open position by means of apparatus, not shown, which is old in the art.

The dud jettisoning mechanism

To prepare for the possibility of a dud or a missile which refuses to fire, a mechanism must be provided to jettison the missile over the side of the ship. Such a mechanism is shown in FIGS. 25 through 36.

Referring particularly to FIG. 25 in which the mechanism is shown with the discharge end to the left of the drawing in distinction to the remainder of the drawings in which the discharge end of the mechanism is shown to the right of the drawings, the jettisoning cylinder 241 carries a piston, not shown, on the end 242 of which is mounted a jettisoning beam 243. This beam is provided with a plurality of rollers 244 which slide in opposed tracks 245 of the support 246. The jettisoning beam 243 has a depending yoke 247 which extends below the support 246 and is reciprocal with the jettisoning beam 243.

Located below the cylinder and the jettisoning beam 243 the retractable rail 208 is pivoted to move toward and away from the jettisoning cylinder and jettisoning beam 243. The retractable rail 208 carries the missile shoes and supports the missile on the guide arm.

Referring to FIGS. 26, 27 and 29 through 31, the retractable rail 208 carries a pair of rods 248 mounted for longitudinal motion in the rail. On their outward end the rods 248 have a cross bar 249 which is adapted to engage the yoke 247 during the jettisoning movement.

Jettisoning is normally ordered from the remote location at Weapons Control. The operator performs the steps for jettisoning and monitors the operation.

Referring to FIGS. 26 and 27, the forward shoe 49 of the missile engages the lever 251, which is pivoted at one end 252. This engagement swings the forward free end of the lever to pivot the crank lever 253 about its pivot 254. The crank lever 253 is in loose engagement with the lever 251 at one end 255 and has its other end 256 mounted in a slot 257 of the spring loaded reciprocal rod 258. The rod 258 carries a pin 259 which is mounted on disc 261. Movement of the rod 258 in one direction under the influence of the crank lever 253 or movement in the other direction under the influence of the spring 262 will rotate the disc 261 through a small arc. This small rotative movement is transferred to a slender initiating rod 263 (FIGS. 27 and 34). The rod 263 is mounted for longitudinal movement in the slender cylinder 264 and the movement of the rod 263 initiates the valve movement which actuates the jettisoning mechanism. The valving mechanism will not be explained in detail as the jettisoning mechanism is the subject of a separate patent application.

The operation of the valve system causes the pair of rods 248 to drift slowly outward permitting the latch 266 to pivot about its pivot 267 and gently engage the shoe 48 of the missile 47. With the engagement of the missile shoe 48, the main piston attached to the beam 243 is actuated and the cross bar 249 is engaged by the yoke 247. The piston and its attached beam 243 move outward carrying the yoke 247 and its engaged cross bar 249. The cross bar is attached to the rods 248 which carry the latch 266. This latch is in contact with the forward shoe of the missile so that the movement of the latch outward sweeps the missile from the retractable rail 208 with sufficient force to jettison the missile overboard.

The missile launcher system above described differs from missile systems which have proceeded it, among other differences, by its compactness which allows it to be completely assembled at the factory where it is made and transported by railroad and shipped to its destination fully assembled and then set up on ship or other base ready for use in a minimum of time. It is designed so that the rotatable parts may be removed as a unit from the magazine. This would allow these parts to be replaced with a minimum of time and labor and would permit overhaul and maintenance to be carried out easily and quickly. Other systems are built-in installations which have to be constructed at a factory, assembled for testing and then completely dissembled, shipped and rebuilt at the destination where they are to be used. The present system provides the first portable missile launching system so designed that the rotatable parts may be separated from the magazine as a unit.

Obviously many modifications and variations of the present invention are possible in the light of the above teachings. It is therefore to be understood that within the scope of the appended claims the invention may be practiced otherwise than as specifically described.

What is claimed is:

1. A misile launching system comprising the combination of
   a stationary cylindrical magazine housing a plurality of vertically positioned missiles arranged in a ring around the circumference of the housing with a rotatable top cover for the magazine, said cover supporting a central post depending into the magazine;
   means mounted on and carried by the central post for hoisting the missiles from the magazine;
   launcher means mounted on and carried by the post for rotating said cover;
   launcher means for receiving the missile from the magazine carried by and rotating with the cover;
   means for elevating said missile receiving launcher means, said elevating means mounted on and being carried by the central post;
   means mounted on and carried by said central post for detachably connecting said hoisting means, said missile receiving launching means, said cover rotating means and said elevating means with a source of power;
   said cover and said central post and its supported means being removable as a single unit from said magazine.

2. A missile launching system according to claim 1 wherein the housing comprises
   a central space; and
   a series of missile receiving cells arranged in a ring around the circumference of the housing.

3. A missile launching system according to claim 2 and including a missile supporting rail located in each of the cells.

4. A missile launching system according to claim 3 and including means carried by each of the rails for engaging and retaining the missiles in the cells.

5. A missile launching system according to claim 4 and including means located in each of the cells and operable through rotation of the top cover for releasing the holding means to permit hoisting of the missile from the cell.

6. A missile launching system according to claim 2 and including means carried by and rotating with the top cover for permitting access to a selected cell from the central space while preventing access to the remaining cells.

7. A missile launching system according to claim 2 and including means associated with and underlying each of the cells for conducting exhaust gases from the interior of the housing to outside of the housing.

8. A missile launching system according to claim 2 and including fire extinguishing means located at the bottom of each of the cells.

References Cited

UNITED STATES PATENTS

| | | |
|---|---|---|
| 3,001,586 | 9/1961 | Kyle. |
| 3,052,303 | 9/1962 | Lapp. |
| 3,049,976 | 8/1962 | Hereth et al. _____ 89—1.812 X |
| 3,065,673 | 11/1962 | Hereth _____ 89—1.805 |
| 3,113,486 | 12/1963 | Kongelbeck _____ 89—1.802 |
| 3,228,296 | 1/1966 | Neuman et al. _____ 89—1.8 |

SAMUEL W. ENGLE, *Primary Examiner.*